(12) United States Patent
Walter

(10) Patent No.: US 10,425,555 B2
(45) Date of Patent: Sep. 24, 2019

(54) METHOD TO FORM A COARSELY DISCRETIZED 3-D DECORATION

(71) Applicant: Alexander D. Walter, Holmdel, NJ (US)

(72) Inventor: Alexander D. Walter, Holmdel, NJ (US)

(*) Notice: Subject to any disclaimer, the term of this patent is extended or adjusted under 35 U.S.C. 154(b) by 369 days.

(21) Appl. No.: 15/395,177

(22) Filed: Dec. 30, 2016

(65) Prior Publication Data

US 2017/0111545 A1   Apr. 20, 2017

Related U.S. Application Data

(60) Continuation of application No. 15/344,543, filed on Nov. 6, 2016, now Pat. No. 9,950,557, which is a division of application No. 14/593,524, filed on Jan. 9, 2015, now Pat. No. 9,505,260.

(51) Int. Cl.

| | |
|---|---|
| *H04N 1/387* | (2006.01) |
| *B44F 1/08* | (2006.01) |
| *B44C 1/28* | (2006.01) |
| *B44C 3/12* | (2006.01) |
| *B29C 65/48* | (2006.01) |
| *B29C 65/56* | (2006.01) |
| *H04N 1/60* | (2006.01) |

(52) U.S. Cl.
CPC .......... *H04N 1/3875* (2013.01); *B29C 65/48* (2013.01); *B29C 65/56* (2013.01); *B44C 1/28* (2013.01); *B44C 3/12* (2013.01); *B44F 1/08* (2013.01); *H04N 1/60* (2013.01)

(58) Field of Classification Search
CPC ........................................................ B44F 1/08
USPC ........................................................ 428/120
See application file for complete search history.

(56) References Cited

U.S. PATENT DOCUMENTS

2010/0099073 A1* 4/2010 Howard ................... B43L 1/06
434/408

* cited by examiner

*Primary Examiner* — Brent T O'Hern

(57) ABSTRACT

A method to make a decoration, the decoration made from a plurality of colored objects arranged in a regular pattern on a colored substrate, individual colored objects discernable at arm's length, with the decoration recognizable at greater distance as corresponding to a digital image. The colored objects may be pushpins, and no colored objects are placed at positions where the substrate color is the desired color. Embodiments also include an apparatus to select a single pushpin from a container of pushpins, and an apparatus to orient a pushpin in preparation for insertion into the substrate.

20 Claims, 11 Drawing Sheets

FIG. 3A 300
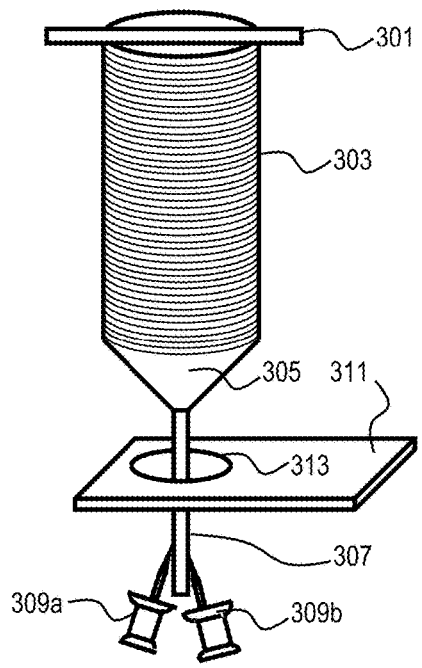
FIG. 3B
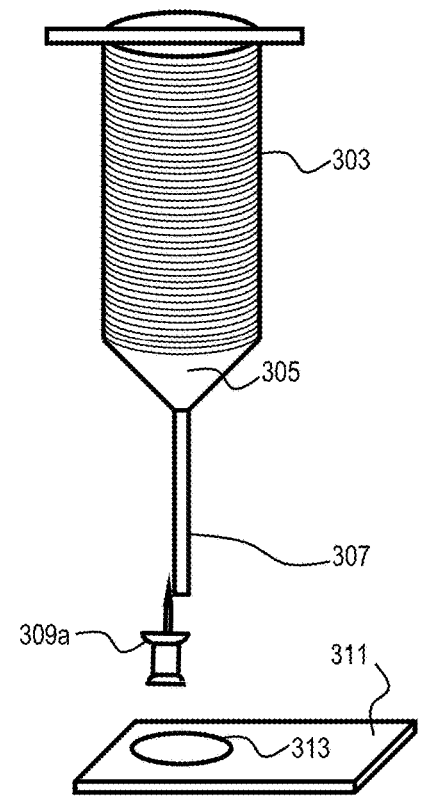
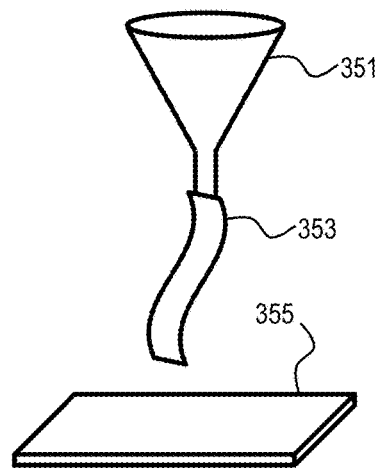

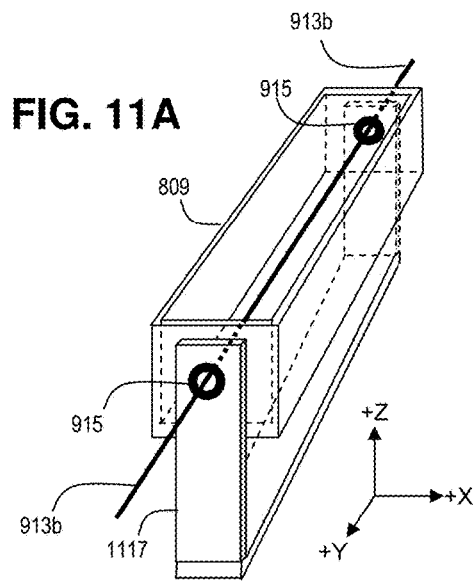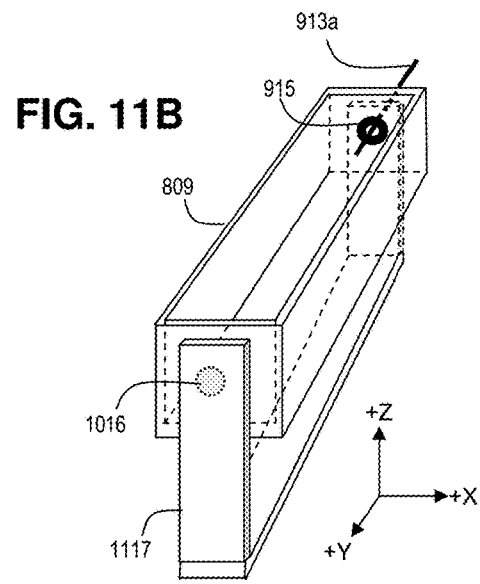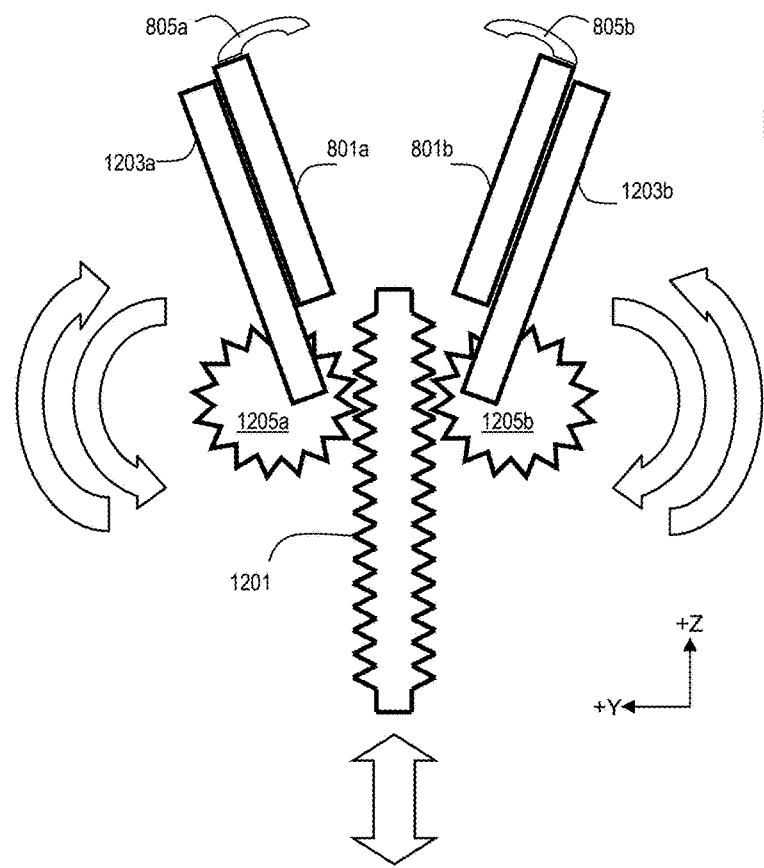

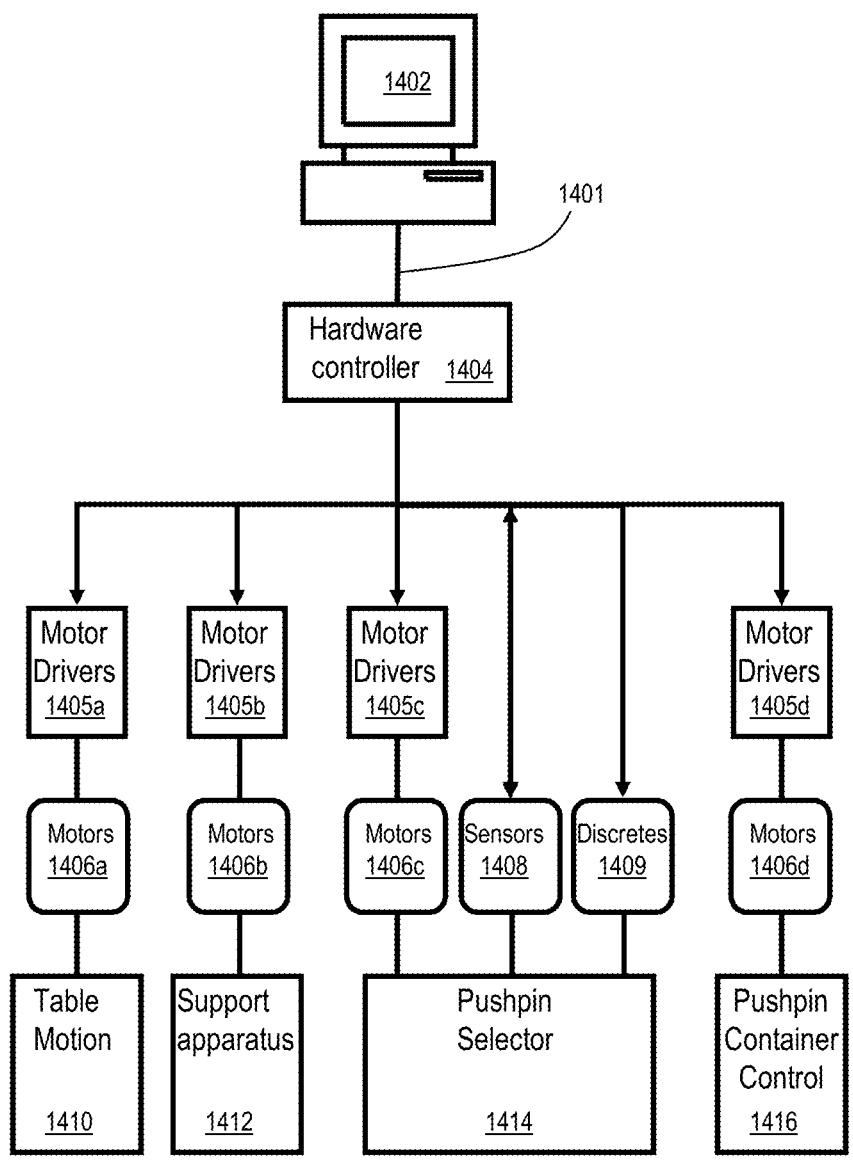

METHOD TO FORM A COARSELY DISCRETIZED 3-D DECORATION

CROSS-REFERENCE TO RELATED APPLICATIONS

This application is a continuation of U.S. patent application Ser. No. 15/344,543, filed on Nov. 6, 2016 and since issued as U.S. Pat. No. 9,950,557, which in turn is a division of U.S. patent application Ser. No. 14/593,524, filed on Jan. 9, 2015 and since issued as U.S. Pat. No. 9,505,260, the entire content of all of which are hereby incorporated by reference in their entireties.

FIELD

Embodiments of the invention pertain to a decorative, coarsely discretized three-dimensional artwork, and apparatus, system and method for making the same.

BACKGROUND

A graphic representation may include a digital photograph (i.e., image captured digitally) or digitized photograph (i.e., image captured as a film-based photograph that is later digitally scanned), both of which will be referred to herein as a digital image. The digital image is formed from a large number of individual picture elements (pixels), with each pixel representing a finely discrete, spatially identifiable portion of the digital image as a single color or shade of gray.

The spatially identifiable portion of the digital image represented by each pixel is usually very small, such that individual pixels ordinarily cannot be seen by the unaided eye. The pixels are arranged in a grid having rows and columns. When the pixels making up the digital image are viewed by a human at a comfortable distance (e.g., arm's length of about 2-3 feet), typically without magnification, the individual pixels are perceived by the eye and mind as blending to form a continuous, non-discretized image. The digital image is finely-discretized (i.e., a finely-discretized digital image), and if in color typically will use a color palette having a large number of possible colors for each pixel, such as 16 million colors representable by a 24-bit color word. The digital image, if in black and white, is also finely-discretized and may include a somewhat smaller but still large number of shades of gray, such as 256 shades (8-bit) or 65,536 shades (16-bit). A difference between adjacent shades or colors is indiscernible or nearly indiscernible to the naked eye.

A graphic representation may also include images not made from photographs, for instance a tessellation, a painting, a collection of geometric shapes, artistic design prints, etc. Non-photographic graphic representations may be scanned or photographed and then further treated as if they are a digital image.

When the finely-discretized digital image is reproduced on a physical medium, such as by printing on paper, the individual pixels are formed by placing a small amount of ink or other colorant (e.g., toner) at a location that corresponds to the location of each pixel in the digital image. The resulting image is a substantially two-dimensional image. The thickness of the image, formed by the thickness of the ink or colorant, is negligible. This produces a flat image. The colorant often covers the entire area of the image (usually a rectangular shape), especially when printing a digital photograph, even when the colorant is the same color as a non-white physical medium (e.g., colored paper stock) it may be placed upon.

SUMMARY OF THE INVENTION

Embodiments of the invention include a decorative coarsely-discretized decoration (e.g., an artwork) corresponding to a coarsely-discretized graphic image, which in turn corresponds to a finely-discretized source image such as a digital image. The coarsely-discretized decoration is constructed using discrete physical objects having a non-negligible thickness. At least some of the physical objects may be colored, the physical objects having colors selected from a color palette that is much smaller than the color palette of the finely-discretized source digital image.

The coarsely-discretized decoration is usable as artwork and may be desirable by many persons for many reasons. For example, there may be a sense of amazement when a coarsely-discretized decoration that is unrecognizable close-up becomes something recognizable as a viewer steps back from it. The coarsely-discretized decoration may thus be understood as pleasing, interesting and conversation-provoking.

Alternatively, some of the physical objects may have other desired, non-color light-affecting properties such as a metallic shine, specular reflection, diffusive reflection, finish (e.g., glossy, semi-glossy, or flat reflective properties), wood grain texture, or a translucent or transparent property.

The physical objects are coupled to a substrate, and are maintained at a corresponding relatively fixed location on the substrate. The substrate includes a colored surface, which may be visible between individual physical objects and at any locations without physical objects. The substrate may have one or more regions forming one or more background colors. The coarsely-discretized decoration need not include colored physical objects at locations of the decoration where the intended color of that location corresponds to the background color, thereby providing an additional three-dimensional texture to the coarsely-discretized decoration.

In some embodiments, the physical objects used to make the coarsely-discretized decoration may be substantially physically identical (e.g., shape, dimensions and weight), but may have different colors selected from a much smaller color palette than that of the finely-discretized digital image. In some embodiments, the physical objects are common pushpins of substantially uniform size. The pushpins may be selected from a small palette, such as a five-color palette that includes the colors red, green, blue, yellow and white. In other embodiments, the physical objects may be thumb tacks or colored stones.

The coarsely-discretized decoration is designed such that when viewed by a human at a relatively close distance, the individual physical objects are perceivable. However, when the coarsely-discretized decoration is viewed by a human at a relatively far distance, the individual physical objects are not perceivable, but rather the physical objects appear to merge and recreate an approximation of a digital image.

Embodiments in accordance with the present disclosure include a decoration, which includes a substrate having a major surface with a substrate color. A plurality of colored objects are affixed to the substrate, each colored object having a respective color selected from a first reduced color palette, such that the first reduced color palette does not include the substrate color. Less than an entire usable portion of the major surface is covered by colored objects. The first reduced color palette and the substrate color together form a second reduced color palette. The colored objects and the substrate color form a coarsely-discretized decoration using the second reduced color palette, with the portions of the coarsely-discretized decoration formed from the colored objects appearing in a plane above the portions of the coarsely-discretized decoration formed from the substrate color. The coarsely-discretized decoration corresponds to a digital image, the digital image having a color palette larger than the second reduced color palette.

Embodiments in accordance with the present disclosure include an apparatus to select a pushpin, which includes a magnet having a ferrous body with a major axis oriented vertically, and a removal tool including a dielectric body with an aperture running vertically through the body, the removal tool capable of being moved from a first position with a portion of the magnet disposed in the aperture and a second position entirely below the magnet. The aperture is co-axial with the ferrous body in both the first position and the second position.

Embodiments in accordance with the present disclosure include an apparatus to orient a pushpin, which includes a flexible surface having a bend axis parallel to the surface and a length along the bend axis, the flexible surface configurable between a planar shape and a concave shape that is concave around the bend axis. The apparatus further includes a first support surface disposed beneath the flexible surface on a first side of the bend axis, wherein the flexible surface rests loosely on the first support surface, and a second support surface disposed beneath the flexible surface on a second side of the bend axis opposite from the first side, wherein the flexible surface rests loosely on the second support surface. The apparatus further includes a support structure to rotatably support the first support surface and the second support surface, wherein the first support surface and the second support surface are each rotatable around a respective axis parallel to the bend axis. The support structure is configured to rotate around an axis perpendicular to the bend axis.

Embodiments of the invention also include methods, apparatus and system to produce a coarsely-discretized decoration made from physical objects having a non-negligible thickness.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 3A illustrates a pushpin selection apparatus with multiple pushpins, in accordance with an embodiment of the present disclosure;

FIG. 3B illustrates a pushpin selection apparatus after removal of excess pushpins, in accordance with an embodiment of the present disclosure;

FIGS. 11A, 11B illustrate perspective views a channel bracket support structure, in accordance with an embodiment of the present disclosure;

FIG. 12 illustrates a mechanism to counter-rotate lateral support surfaces, in accordance with an embodiment of the present disclosure;

FIG. 14 illustrates a functional block diagram of a system for creating a pushpin artwork, in accordance with an embodiment of the present disclosure.

DETAILED DESCRIPTION

Figure 1:
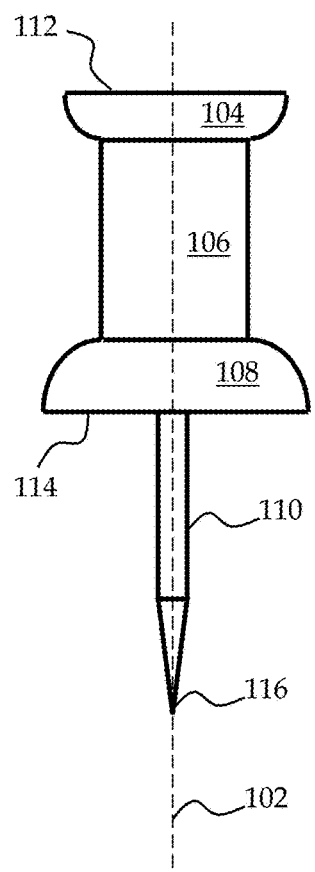
FIG. 1 is a planar view of a conventional pushpin, usable in accordance with an embodiment of the present disclosure.

As used herein unless the context clearly indicates otherwise, perceiving an object at a viewing distance refers to an ability by a human to distinctly see the object at the viewing distance with the unaided eye. Discerning a digital image refers to an ability of a human to view a group of pixels (either with or without perceiving the individual pixels), and from that to recognize and/or to understand in the human's mind the digital image of which the group of pixels are a part of.

A digital image (also referred to herein as a finely-discretized digital image), an example of which is a digital photograph, is formed from a large number of individual pixels, with each pixel representing a finely discrete, spatially identifiable portion of the digital photograph as a single color or shade of gray. At a typical close-up viewing distance, e.g., at arm's length from the digital photograph (i.e., a distance of about 2-3 feet), the individual pixels appear to be very small, such individual pixels ordinarily cannot be perceived by the unaided eye. At a more distant viewing distance, e.g., from across a room (i.e., a distance of about 10 feet or more), the individual pixels appear to be even smaller than at close-up viewing distances and therefore the pixels also cannot be individually perceived. At viewing distances ranging at least from close-up (e.g., arm's length) to the more distant distances (e.g., across the room), the mind is able to discern the digital image even though individual pixels cannot be individually perceived.

A pushpin is physically much larger than a spot of ink or colorant, and therefore a finely-discretized digital image of practical size cannot be made from pushpins. A practical size refers to a size that may be conveniently hung indoors (e.g., on a wall in a home or office). An image of practical size made from pushpins or similar-sized physical objects will be a coarsely-discretized digital image.

When pushpins are used as colored physical objects and placed on a substrate to form a pushpin artwork, the pushpins still are individually perceivable when at an arm's length distance, but the overall digital image is not ordinarily discerned. However, when the pushpin artwork is viewed from a greater distance such as across a room, the overall digital image is readily discerned.

The substrate ordinarily is a substantially flat surface that couples with the individual physical objects. The substrate tends to substantially maintain the physical objects at a corresponding fixed location on the substrate. For instance, for a pushpin artwork, the substrate may be a foam board having a thickness of at least about 0.25". Such foam boards are readily available in a variety of solid colors, including black. The substrate thickness provides axial stability to the individual pushpins. With thinner substrates, there is a greater likelihood that the individual pushpins may sag, shift, droop, etc. as the pushpin artwork is shifted from laying horizontally to hanging vertically.

For a 0.25" thick foam board, pushpins are likely to protrude from the rear of the coarsely-discretized decoration, therefore care should be taken during fabrication that the pushpins are fully inserted, and care taken during and after fabrication in order to avoid pinpricks.

Alternatively, other types of substrates can be used for a pushpin artwork, such as corkboard or corrugated cardboard, so long as there is sufficient thickness to provide axial stability and that the substrate is puncturable by a pushpin. Such other types of substrates may provide a combination of color or pattern (e.g., a mottled brown color for corkboard) and/or texture (e.g., ribbed in the case of corrugated cardboard) that may be desirable for some pushpin artwork. In some embodiments, the substrate should be puncturable by a force capable of being exerted by a human without tools. In other embodiments, the substrate should be puncturable by a force capable of being exerted by a human using light tools, such as tapping with a hammer or the like. Axial stability of a finished pushpin artwork may be improved by applying an epoxy or the like in order to more securely attach pushpins to the substrate. The epoxy would normally be applied to the back (rear-facing) side, however an epoxy could be applied to the front side so long as the apparent color of the substrate is not significantly changed (e.g., either a transparent epoxy or an epoxy that is the same color as the desired color of the substrate). Alternatively, the color of the epoxy itself may be considered to be a background color, rather than the color of the underlying substrate, if the epoxy covers the entire substrate.

Alternatively, if the physical objects are attached to the substrate by an adhesive rather than by a puncture, then the substrate can be thinner so long as the substrate is adequate rigid to prevent excessive sagging, risk of tearing, and the like that would affect the display of the coarsely-discretized decoration.

The substrate may have one or more regions forming one or more background colors. The color may be imbued into the material of the substrate, or may be formed by a colored surface layer, a painted layer or other colorant having a thickness much smaller than the size of the physical objects. Physical objects need not be placed at locations of the coarsely discretized graphic image where the intended color of that location corresponds to the background color, thereby providing an additional three-dimensional texture to the coarsely discretized graphic image.

Embodiments of the invention include a coarsely-discretized decoration corresponding to the digital image, the coarsely-discretized decoration constructed using colored physical objects having a non-negligible thickness, and arranged on a substrate. Examples of colored physical objects include push pins, beads, thick stickers, small stones (e.g., polished stones), and the like. Ordinarily, the colored physical objects will be of a substantially uniform cross-sectional size in the plane of the digital image, but non-uniform cross-sectional sizes are contemplated if it is desired to provide more than one level of coarseness in the coarsely-discretized decoration. In some embodiments, physical objects of non-uniform cross-sectional sizes nevertheless may have substantially the same height when inserted into a substrate. Physical objects of larger cross-sectional size will produce a more coarse image or portion of an image, and physical objects of smaller cross-sectional size will produce a less coarse (i.e., more fine) image or portion of an image. For instance, in a coarsely-discretized decoration based upon a digital photograph of a face, some embodiments may represent certain features such as the eyes using a different level of coarseness than other features such as the forehead. For regions of an image that spatially do not change quickly (e.g., a clear blue sky), physical object of larger cross-sectional size may be acceptable.

The size of the colored physical objects is selected such that at a typical close-up viewing distance, e.g., at arm's length from the coarsely-discretized decoration (i.e., a distance of about 2-3 feet), the individual physical objects are perceived by the unaided eye, but the source digital image from which the coarsely-discretized decoration is derived is not necessarily discerned. However, when viewed from a farther distance such as across a room (i.e., a distance of about 10 feet or more), the source digital image can then be discerned, regardless of whether or not the individual colored physical objects are still perceived. For example, pushpins can be used as the physical objects for this purpose. An artwork having colored pushpins placed onto a substrate in a desired pattern may be referred to herein as a pushpin artwork. Reference will be made herein throughout to pushpins for sake of clarity, and the coarsely-discretized decoration may be referred to as pushpin artwork for sake of clarity. However it should be understood that other types of physical objects other than pushpins may be used, and other kinds of coarsely-discretized decoration other than pushpin art may be produced, unless the context clearly indicates otherwise.

Embodiments in accordance with the present disclosure recognize that a substrate color may be considered as an additional color that is available for use in making a pushpin artwork.

FIG. 1 illustrates a side planar view of a typical pushpin 100. Pushpin 100 is rotationally symmetric around axis 102. Pushpin 100 includes a relatively narrow cylindrical shaft 110 having a proximal end tapered to a sharp tip 116, and a distal end coupled to a first circumferential ridge 108. First circumferential ridge 108 includes a substantially flat major surface 114 perpendicular to axis 102 and facing cylindrical shaft 110. First circumferential ridge 108 is further coupled to a proximal end of central portion 106, on a side of first circumferential ridge 108 that is opposite of flat major surface 114. Central portion 106 has a cylindrical shape that is narrower than first circumferential ridge 108 but relatively wider than cylindrical shaft 110. The center of central portion 106 aligned substantially coincident with axis 102. Central portion 106 includes a distal end coupled to a second circumferential ridge 104, which has a diameter greater than the diameter of central portion 106. Second circumferential ridge 104 includes a substantially flat major surface 112 perpendicular to axis 102 and facing away from cylindrical shaft 110. Circumferential ridges 104, 108 nominally have a circular cross-sectional shape in a plane perpendicular to axis 102, but may exhibit relatively minor eccentricity that does not substantially detract from the ability of pushpin 100 to roll on a surface.

Central portion 106, first circumferential ridge 108 and second circumferential ridge 104 are typically constructed from a dielectric material such as a hard plastic or the like. Cylindrical shaft 110 is typically constructed from a magnetic material such as steel or iron.

Pushpin 100 typically has a weight of approximately 0.400 grams. Typical dimensions of pushpin 100 are illustrated below in Table 1 for two separate suppliers. Pushpins from the same supplier have substantially similar dimensions.

TABLE 1

| Parameter | Supplier "A" | Supplier "B" |
| --- | --- | --- |
| Length of pushpin 100 | 22.3 mm | 23.3 mm |
| Distance from major surface 112 to major surface 114 | 12.4 mm | 12.1 mm |
| Length of cylindrical shaft 110 | 9.9 mm | 11.2 mm |
| Diameter of cylindrical shaft 110 | 1.1 mm | 1.1 mm |
| Diameter of first circumferential ridge 108 | 8.8 mm | 8.0 mm |
| Diameter of second circumferential ridge 104 | 7.0 mm | 7.0 mm |

A spacing between pushpins may be provided in order to facilitate insertion of the pushpin onto the substrate. Therefore, a typical center-to-center spacing of the pushpins may be about 10 mm (1 cm) when spacing is included.

Figure 2A:
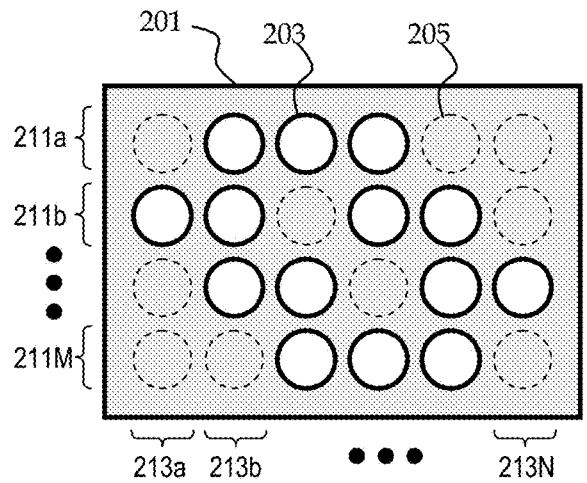
FIG. 2A, 2B illustrate a top planar view of a plurality of pushpins used to create a portion of a pushpin artwork, in accordance with an embodiment of the present disclosure.

FIG. 2A illustrates a top planar view of a plurality of pushpins used to create a portion of a pushpin artwork, in accordance with an embodiment 200 of the present disclosure. FIG. 2A is not necessarily drawn to scale. Embodiment 200 illustrates a colored substrate 201 having disposed upon it a plurality of pushpin positions arranged in a plurality of rectangular grid positions forming M rows 211a . . . 211M, and N columns 213a . . . 213N. Substrate 201 is colored on at least a top major surface. In some embodiments, substrate 201 may be colored black. Pushpin positions may be either populated by a pushpin such as pushpin 203, or may be unpopulated, such as position 205. A grid position is populated by a pushpin by affixing a pushpin to substrate 201 at the grid position. More particularly, pushpin 100 may be affixed by pushing sharp tip 116 and narrow cylindrical shaft 110 at least partially into substrate 201. In some embodiments, pushpin 100 will be inserted into substrate 201 until stopped by first circumferential ridge 108 making contact with substrate 201. Sharp tip 116 and/or narrow cylindrical shaft 110 may protrude at least partially from the rear of substrate 201, the rear being a major surface opposite from the colored top major surface.

A color of pushpin 203 will be selected from among a relatively small color palette, and the coarsely-discretized decoration at the position of pushpin 203 will take on the color of pushpin 203. At unpopulated pushpin positions such as position 205, the coarsely-discretized decoration will take on the color of substrate 201. In between pushpins 203, small portions of substrate 201 may be visible.

Figure 2B:
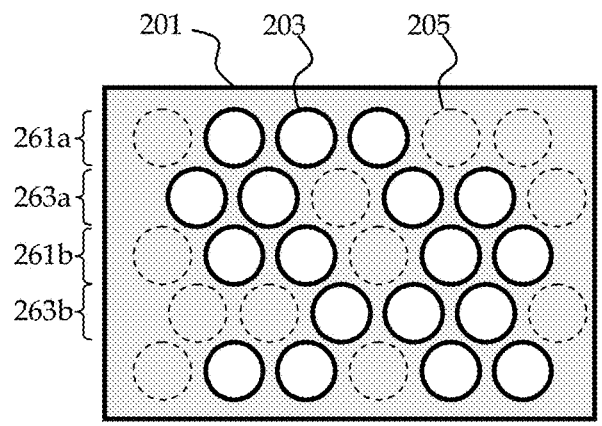

FIG. 2B illustrates a top planar view of a plurality of pushpins used to create a portion of a pushpin artwork, in accordance with an embodiment 250 of the present disclosure. FIG. 2B is not necessarily drawn to scale. Embodiment 250 is similar to embodiment 200 of FIG. 2A, except that the plurality of pushpin positions are staggered from one row to an adjacent row, i.e., a plurality of staggered rectangular grid positions. For example, row 261a is horizontally staggered by about half of a pushpin position from row 263a, and row 263a is horizontally staggered by about half of a pushpin position from row 261b. Rows 261a and 261b are not substantially staggered relative to each other. Rows 263a and 263b also are not substantially staggered relative to each other. An advantage of embodiment 250 compared to embodiment 200 is that pushpin positions are more closely packed together in embodiment 250, and thus may provide a more continuous perception of color when viewed from a sufficient distance because less of substrate 201 is visible between pushpins 203. Although FIG. 2B illustrates rows as being staggered, columns may be staggered by rotating embodiment 250 by 90 degrees.

Other pushpin layouts may also be used. More generally, tessellations may be used (e.g., triangle, hexagon, parallelogram, rhombus, trapezoid, etc.), with pushpins being placed at vertices of the tessellation pattern. Such pushpin locations may form a non-rectangular grid position pattern.

If the coarsely-discretized decoration is made from other colored objects instead of, or in addition to pushpins, the colored objects may be affixed to the surface of substrate 201 by an adhesive, an epoxy, or the like.

A portion of substrate 201 will be considered covered if a pushpin or other colored object is located on the portion of substrate 201. A portion of substrate 201 will be considered uncovered if a pushpin or other colored object could have been located at the portion of substrate 201, but in-fact no pushpin or other colored object is located there. If a gap exists between adjacent portions of substrate 201 where pushpins or other colored objects are located, such that substrate 201 is visible in the gap, such a gap will still be considered a covered part of the substrate.

A margin may be reserved around at least a portion of the periphery of substrate 201 for framing, edge avoidance or tolerance, etc., without the margin being considered an uncovered portion of substrate 201. The margin, where provided, may be of substantially uniform width. The margin is not considered to be a usable portion of the substrate, therefore a usable portion of substrate 201 does not include the margin if it is provided.

For example, with respect to FIG. 2A, the portion of substrate under the intersection of first column 213a, second row 213b is considered covered, but the rest of the first column 213a is considered uncovered, exclusive of margins at the top and bottom of column 213a. The portion of substrate 201 under the intersection of first column 213a and first row 211a is not considered a part of either a top margin or left margin. The portion of substrate under the second column 213b from the first to third rows is considered to be continuously covered, while the portion under the fourth row in the second column 213b is uncovered.

Advantages of Embodiments

Embodiments, by utilizing the substrate color as an additional color in the color palette confers several benefits.

First, the coarsely-discretized image may provide a better color match to the finely-discretized image than a coarsely-discretized image without usage of the background, because of the usage of an additional color (i.e., the background color). Having an additional color lessens the overall quantization error of the pushpin artwork.

Second, usage of the substrate as a background color means that such a pushpin artwork may be perceived as having depth. The pushpins 100 ordinarily are inserted at a direction substantially perpendicular to the plane of substrate 201, with top major surface 112 approximately 1 cm above substrate 201. The top major surfaces 112 of the pushpins 100 collectively form a first plane that encompasses the portion of the pushpin artwork colored by pushpins. Regions without pushpins, i.e., the exposed substrate as a background color, form a second plane that will appear to be recessed compared to the image areas formed by the pushpins. Therefore, colors formed by the pushpins will be perceived as being in a plane that floats above the substrate. This gives the pushpin artwork a three-dimensional (3-D) characteristic, but with only two image planes in the physical Z-direction perpendicular to substrate 201. Only two image planes are ordinarily possible when using pushpins all having substantially the same physical dimensions.

In some embodiments, at least some of the pushpins may be inserted at a non-perpendicular angle, i.e., an angle less than 90 degrees to the plane of substrate 201, in order to create the illusion of lines or flowing motion when viewed from a sufficient distance. Such lines or flowing motion may be useful for depicting objects such as hair, moving objects (e.g., flowing water, flags, etc.), and so forth, without departing from the three-dimensional characteristic of the pushpin artwork.

Minor variations may exist in the height or top major surfaces 112 of pushpins 100, without departing from the substantially planar nature of the first plane, i.e., the plane that encompasses the portion of the pushpin artwork colored by pushpins 100. Minor variations are relatively small compared to the height of pushpin 100 when inserted into substrate 201. For example, top major surface 112 of a pushpin 100 may have minor variations if it is not precisely flat. Minor variations may also exist from one pushpin 100 to another if some of pushpins 100 are not fully inserted into substrate 201. Minor variations may also exist for pushpins from different suppliers. Minor variations may also exist for a pushpin 100 if it is inserted at a non-perpendicular angle with respect to substrate 201. For example, if pushpin 100 is inserted at an angle of about 30 degrees from perpendicular, and if top major surface 112 has a diameter of about 7 mm, then there is a 3.5 mm variation in the height of top major surface 112. The 3.5 mm variation is still minor compared to the approximately 12.4 mm distance between major surface 112 and major surface 114.

Third, usage of the substrate color as one color of the image means that fewer pushpins are needed to make the pushpin artwork, resulting in less material needed (i.e., fewer pushpins) and concomitant less cost of materials and potentially faster manufacturing time. The pushpin artwork will be lighter, meaning that it will be less costly to ship to a customer and will be easier to hang on a wall because it is lighter. There will be fewer pushpins that may be susceptible to being dislodged.

Fourth, usage of fewer pushpins means greater structural integrity of the substrate. Each pushpin when inserted creates a tiny hole in the substrate, and may extend through the entire substrate if the length of cylindrical shaft 110 is greater than the thickness of the substrate. These holes may act as a perforation, causing the substrate to be susceptible to cracking if too much bending stress is applied. Therefore, having fewer holes caused by pushpins should cause the substrate to be more resistant to cracking.

Color Selection

At least some of the physical objects may be colored, the colors of the physical objects forming a color palette. The color palette of the physical objects is much smaller than the color palette of a typical digital image. For example, pushpins typically are available in only the five colors of red, green, blue, yellow, and white, representable as a reduced palette of five colors. It is well known that additional colors can be discerned by the mind from a weighted combination of other colors when viewed from a sufficient distance. With respect to the pushpin artwork, additional colors are simulated by selecting and placing colored pushpins such that, from a farther distance such as across a room, the viewer's mind discerns additional colors.

In addition, the substrate may itself have a color that is different than the colors within the color palette of the pushpins. The substrate may therefore be used to provide an additional color, thus typically making a six-color reduced palette for a pushpin artwork. Usage of the substrate as an additional color can be useful when the substrate color is that of a background color of a digital image, or when the substrate color is a color of the coarsely-discretized digital image which is not already one of the five pushpin colors. For example, the substrate may be black to represent a dark background, or to provide greater color contrast with the colored physical object. Alternatively, the substrate may include a second background color that is different than a first background color. For instance, the lower portion of the substrate may have a first background color to represent the ground, and the upper portion of the substrate may have a second background color to represent the sky.

Image processing dithering or remapping algorithms, known to persons of skill in the art, can be used to remap the colors of the digital image onto the reduced color palette of the pushpins and substrate. However, remapping the colors this way introduces a quantization error. The remapping algorithms may include error diffusion, such that the quantization error is diffused and therefore helps to prevent unwanted banding or abrupt color boundaries in the color-reduced image. Examples of such algorithms are Floyd-Steinberg dithering, Burkes dithering, and Stucki dithering.

In addition, some of the physical objects may have other desired light-affecting properties, such as a metallic shine or a translucent or transparent property. For example, the metallic shine may be useful in portions of the coarsely-discretized decoration that are intended to represent a shiny object such as silver jewelry, or a glint of reflection, etc. Physical objects that are translucent or transparent may be useful to represent portions of the coarsely-discretized decoration that have a translucent or transparent property, such as a cornea, a glass object, etc.

Pushpin Selection

Pushpins may be inserted one at time into a substrate, in row-major or column-major order, depending upon a color from the reduced palette that is needed at the row, column location. Once the color is selected, the appropriate colored pushpin needs to be selected, or the location is skipped if the selected color corresponds to the background color.

Prior to selecting a pushpin, pushpins may be pre-sorted into containers (e.g., bins) such that the containers each contain a single color of pushpins, respectively. During construction of a pushpin artwork, pushpins of a desired color are to be selected one at a time from the appropriate container, depending upon what color of pushpin is to be inserted next into the substrate. Since the pushpins in a container are in a substantially random orientation and may be loosely interlocked with other pushpins, this presents a challenging problem. A selection apparatus is used to select a single pushpin.

In some embodiments, a single pushpin may be selected by using a cylindrical container, open at the top, and oriented such than a major axis of the cylindrical container is tilted at a predetermined angle off of a vertical direction. The predetermined angle depends at least in part on how full the container is. Fullness may be measured by the weight of the container plus pushpins within it. A more full container will be tilted by a relatively smaller angle from vertical compared to a less full container. When tilted, the cylindrical container may be rotated, while causing the tilt to slowly increase, until one pushpin falls out. An interior wall surface of the container may include ridges or the like in order to help push out a pushpin as the container turns. Such an embodiment may be susceptible to more than one pushpin falling out at one time.

In some embodiments, a single pushpin may be selected by using an auger that rotates within a pipe. The bottom of the pipe and auger will be located within the pushpin container. As the auger turns, pushpins will be pushed up the pipe. The auger will stop when a pushpin falls out of the pipe. However, such a method may be susceptible to jamming if a pushpin becomes lodged between the auger and pipe.

In some embodiments, a single pushpin may be selected by using a suction apparatus. In some embodiments, a suction tip should be sufficiently small that at most only one pushpin will be held to the suction tip by suction power, without the pushpin being sucked entirely through the suction tip. The selected pushpin can then be delivered by stopping the suction. In other embodiments, the suction tip may be wide enough to let a pushpin pass and be delivered through a suction tube. However, a suction apparatus may be difficult to implement due to the irregular shape of pushpins.

In some embodiments, a single pushpin may be selected by using a magnet of a predetermined range of strengths. The shaft portion of pushpins is ordinarily made of a ferrous material (e.g., iron or steel), and will be attracted to a magnet. The magnet strength should be strong enough to pick up at least one pushpin, but should not be too strong that it would frequently pick up too many pushpins (e.g., more than about three) at one time. However, a sufficiently strong magnet may occasionally pick up more than one pushpin. This situation will be addressed below with respect to FIGS. 3A and 3B. A pushpin container used with a magnet may have an open portion that is accessible from a vertical direction, e.g., an open container, a container having a lid with an opening cut into it, a gravity-fed dry dispenser, and so forth.

A magnet or electromagnet usable as a pushpin selection apparatus includes a ferrous body oriented vertically, e.g., having rotational symmetry around a vertical axis. If the pushpin selection apparatus comprises an electromagnet, the pushpin selection apparatus further includes electrically conductive coils wound generally helically around the ferrous body, and the ferrous body acts as a magnetic core.

The ferrous body should have a narrow or tapered tip in order to help pick up just one or a small number of pushpins at one time. For example, in one embodiment a narrow tip may have a diameter of less than about ¼ inch. In another embodiment, the narrow tip may have a diameter of about ⅛ inch to about ¼ inch. If an electromagnet is used, the narrow tip may be exposed and bare of electromagnetic coils. The narrow tip should be at least about 0.5 inches in length, the length determined by efficacy in magnetically attracting a pushpin. In some embodiments, the narrow tip may be at least about 1 inch long. The magnet should be strong enough to pick up a 0.4 gram pushpin. However, in some embodiments, the magnet should be sufficiently weak such that a pushpin will tend to be suspended upside down due to the force of gravity, since this orientation may facilitate removal of excess pushpins. A weak magnet also facilitates dislodging a pushpin when desired, e.g., by pushing off the pushpin or imparting a force to the magnet (e.g., a shake, jolt, vibration, etc.). In some embodiments, the electromagnet should be weaker than that necessary to hold a weight of 10 grams. If an electromagnet is used, the electromagnet may be de-energized in order to let a pushpin disengage more easily from the electromagnet.

FIG. 3A illustrates a selection apparatus 300 in accordance with an embodiment of the present disclosure. Embodiment 300 operates by magnetic principles, and is supported by (or suspended from) magnet support structure 301 above a pushpin container (not illustrated in FIG. 3A) that contains pushpins. Embodiment 300 includes electromagnetic coils 303 wound around a core 305. Core 305 may include a tip 307 configured to attract pushpins 100 magnetically. In some embodiments, tip 307 may be tapered to be more narrow than the remainder of core 305. Tip 307 may have a diameter of about ⅛ inch to ¼ inch, and a length of about 1 inch, with no electromagnetic coils wrapped along the entirety of tip 307. However, other combinations of diameter and length of tip 307 are also usable. The length of tip 307 should be chosen to facilitate usage of removal tool 311, as described below in further detail.

Embodiment 300 and pushpins 100 within the pushpin container would be brought together (e.g., by using magnet support structure 301 to lower embodiment 300, or by raising the pushpin container), such that at least a portion of tip 307 attracts and contacts one or more pushpins 100.

Embodiment 300 is illustrated having already brought into contact with pushpins 100, and two pushpins 309*a*, 309*b* are illustrated as attracted to tip 307. For a sufficiently narrow tip 307 and weak magnetic strength, pushpins 309*a*, 309*b* will tend to orient themselves vertically due to gravity. However, excess pushpins may not all be able to orient themselves vertically due to portions of pushpins 309 pushing against each other (e.g., first circumferential ridges 108, respectively), or if first circumferential ridge 108 is pressed against cylindrical shaft 110. Since only one pushpin is intended to be selected at one time, excess pushpins should be removed.

Removal tool 311 may be used to remove excess pushpins from tip 307. The pushpin container may be kept below tip 307 until excess pushpins are dislodged, in order to catch dislodged pushpins. Removal tool 311 may be made from a dielectric material (e.g., wood, plastic, aluminum) so that removal tool 311 is not magnetically attracted to tip 307. The outer shape of removal tool 311 is not important, but removal tool 311 should be thin compared to the length of tip 307, and removal tool 311 should be strong enough to impart sufficient force to push pushpins 309*a*, 309*b* along tip 307 while embodiment 300 is magnetically energized. Removal tool 311 may be integrated into a lid of the pushpin container, or may be separate from the pushpin container.

Removal tool 311 includes an aperture 313. Aperture 313 may be substantially circular, and ordinarily situated such that tip 307 and aperture 313 are co-axial. Aperture 313 may have a radius at least equal to the radius of tip 307 plus the radius of cylindrical shaft 110 plus the radius of first circumferential ridge 108. However, aperture 313 should be narrow enough to prevent passing a pushpin 100 oriented such that tip 116 and first circumferential ridge 108 are simultaneously contacting cylindrical shaft 110. Accordingly, referring to the exemplary pushpin dimensions, aperture 313 may have a radius less than the sum of 12 mm plus the radius of tip 307.

Usage of removal tool 311 starts with removal tool 311 in a retracted position, such that tip 307 is disposed below or within aperture 313. After one or more pushpins 309 are attracted to tip 307, tip 307 is slowly drawn through removal tool 311, by either raising tip 307 or lowering removal tool 311 or a combination of such actions.

As tip 307 is drawn slowly through aperture 313, multiple pushpins ordinarily cannot fit through aperture 313 if they are being held at a non-vertical angle due to blockage from another pushpin or from cylindrical shaft 110. The pushpins will be pushed toward the end of tip 307, and excess pushpins will be pushed off one by one. Removal tool 311 should be drawn slowly, so that when only one pushpin 309 remains magnetically attracted to tip 307 (e.g., pushpin 309a illustrated in FIG. 3B), the remaining pushpin has time to orient itself vertically due to gravity and pass through aperture 313. The end result is illustrated in FIG. 3B.

After one pushpin (e.g., pushpin 309a) remains attracted to tip 307, removal tool 311 may be moved relative to tip 307 so that removal tool 311 does not interfere with removing pushpin 309a from tip 307.

In some circumstances, after tip 307 has passed through aperture 313, multiple pushpins may still magnetically adhere to the electromagnet (e.g., if the diameter of aperture 313 is too big or the electromagnet is too strong to reliably select only one pushpin). In other circumstances, no pushpins may adhere if all pushpins were pushed off (e.g., diameter of aperture 313 is too small, electromagnet is too weak, or a specific orientation of pushpins before the electromagnet tip is passed through the cutout, in order to reliably select one pushpin). Detection of either case may be made optically, ultrasonically, or by weight, either before or after the electromagnet is de-energized. In either case, a pushpin selection needs to be repeated until exactly one pushpin is selected.

Pushpin Orientation, Placement and Insertion

Once a single pushpin 100 (such as pushpin 309a) has been selected by a selection apparatus (such as apparatus 300), pushpins 100 may be oriented, positioned and inserted at desired locations on substrate 201 in one of a number of ways. In one embodiment, positioning and insertion may be by way of gripping arms configured to grip pushpin 100 along the side of first circumferential ridge 108, second first circumferential ridge 104, and/or central portion 106. Optionally, if the pushpins 100 are arranged in a rectangular grid, at least one of the gripping arms may be located on a diagonal of the grid, in order to allow more room for the gripping arm so positioned. The other griping arms may be oriented toward an unfinished portion of the artwork, thereby reducing or eliminating the need for spacing in that direction. Once positioned, the gripping arm may insert pushpin 100 into substrate 201 by applying sufficient force to push pushpin 100 into the substrate 201.

Alternatively, a holding apparatus may hold pushpin 100 along surface 112, and then applying an insertion force to insert pushpin 100 into substrate 201. The holding apparatus may reduce the need for, or size of, the spacing between pushpins 100. The holding apparatus may operate by one or more of suction, magnetic attraction, an adhesive, and so forth. An adhesive, if used, should be sufficiently strong to hold a 0.4 gram pushpin against gravity, but is weaker than the grip of pushpin 100 to substrate 201. The adhesive should not leave a residue on pushpin 100, which might attract dirt and discolor it. For example, a low-tack pressure-sensitive adhesive similar to that used for repositionable paper notes may be used. Once positioned, the holding apparatus may insert pushpin 100 into substrate 201 by applying sufficient force to push pushpin 100 into substrate 201.

Figure 4:
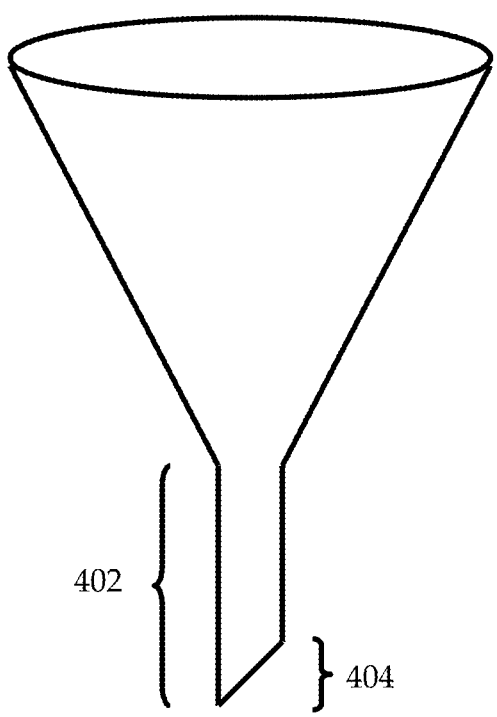
FIG. 4 illustrates a funnel as known in the conventional art.

Alternatively, pushpin 100 may be positioned by use of a conventional funnel as known in the art, such as funnel 400 illustrated in FIG. 4. When funnel 400 is used in a placement apparatus, pushpin 100 should be oriented so that it drops through funnel 400 with sharp tip 116 pointing downward rather than pointing upward. Funnel 400 may be used by placing neck 402 at the desired insertion position, with the tip of neck 402 on or just above substrate 201, and then dropping pushpin 100 through funnel 400 point-first such that sharp tip 116 of pushpin 100 makes contact with substrate 201 at a desired location. As neck 402 holds pushpin 100 in place, pushpin 100 may be inserted into substrate 201 by providing a force on top surface 112 of pushpin 100. After insertion, funnel 400 may be lifted and moved relative to substrate 201 to the next position to insert another pushpin 100. If the tip of neck 402 includes a sufficiently-sized cutout 404 in the wall, then the lifting step may be eliminated. Such a cutout 404 should be tall enough to let pass pushpin 100 that has been pushed into substrate 201, but not so tall as to allow pushpin 100 whose tip 116 is merely resting on substrate 201 to pass through cutout 404. A cutout 404 that is too tall risks that pushpin 100 will fall through cutout 404 before pushpin 100 is inserted into substrate 201. In some embodiments, the height of cutout 404 may be between about 13-22 mm. In some embodiments, funnel 400 may be held above the surface of substrate 201 such that the top of cutout 404 is between about 13-22 mm above the surface of substrate 201. Height of cutout 404 is measured up to a point that is wide enough to allow second circumferential ridge 104 to pass through cutout 404. An interior diameter of the neck of the funnel may be about 9 mm.

The lifting step, if used, of funnel 400 may be accomplished by use of a Z-axis motion apparatus such as a vertical slide coupled to a Z-axis force applicator such as a lead screw. Vertical travel should be sufficient to lift the tip of neck 402 above the height of a pushpin 100 when inserted into substrate 201, a distance of about 13 mm. Because of the relatively small vertical travel that may be needed and relatively lightweight load, alternative sources of a Z-axis force may be usable. For example, Z-axis force may be provided by a pinion gear meshing with a rack, a belt drive, a gear and sprocket drive, and so forth. Z-axis force may also be provided by a flexible material (rope, string, thread, fishing line, etc.) wound around a spool to provide force in the +Z-axis direction, with force in the −Z-axis direction provided by gravity or a spring pulling downward.

When funnel 400 is used to position pushpin 100 on substrate 201, embodiment 300 may be de-energized in order to cause pushpin 309a to drop from tip 307. A slight movement, vibration, jolt, or the like may be imparted through magnet support structure 301 in order to overcome any residual magnetism that may cause pushpin 309a to remain attracted to tip 307 after de-energizing. A collection apparatus 351 may be placed beneath embodiment 300 in order to collect pushpin 309a after it drops from tip 307. Removal tool 311 may then be returned to a retracted position in anticipation of selecting a next pushpin.

A first funnel (such as funnel 400), with optional guide tube 353, is usable as a collection apparatus 351. Collection apparatus 351 may deliver pushpin 309a to a flat planar surface 355. However, a first funnel with guide tube 353 is not sufficient by itself to position a pushpin on substrate 201, since pushpin 309a is likely to drop through the funnel with sharp tip 116 pointing upward. Therefore, a second funnel, such as funnel 400, would be used when positioning pushpin 100 on substrate 201 in preparation for insertion.

Alternatively, in some embodiments, flat planar surface 355 may be placed directly below embodiment 300 in order to receive pushpin 309a as it drops off from tip 307, without use of collection apparatus 351.

Figure 5A:
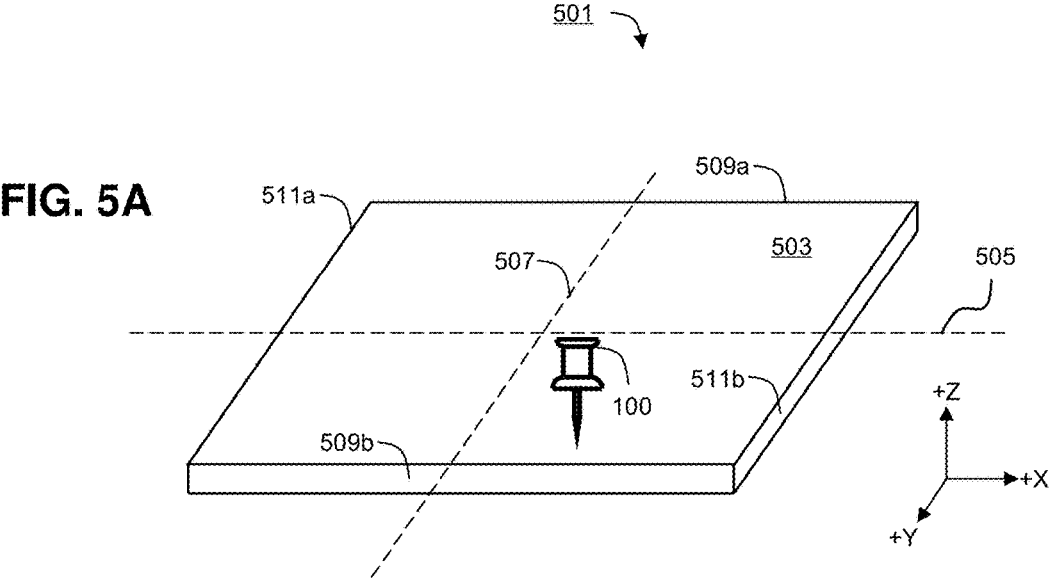
FIG. 5A illustrates a perspective view of a flexible surface in a horizontal orientation, in accordance with an embodiment of the present disclosure.

In preparation for insertion, pushpins should be oriented with sharp tip 116 facing substrate 201. However, when a selected pushpin 100 (such as pushpin 309a) is released by selection apparatus 300, the selected pushpin may be in an unknown orientation when received onto flat planar surface 355. Therefore, flexible surface 501 illustrated in a perspective view of FIG. 5A may be used to orient the selected pushpin into a known orientation. In some embodiments, flexible surface 501 may be used as the flat planar surface 355 illustrated in FIG. 3B. XYZ coordinate directions are shown in FIG. 5A. Unless clearly indicated otherwise by the context of usage, all figures herein refer to "lateral" as being parallel to the X-axis, and "transverse" as being parallel to the Y-axis.

Flexible surface 501 may be configured to be substantially planar (i.e., substantially flat). Flexible surface 501 includes major axis 505 parallel to the X-axis, and a minor axis 507 parallel to the Y-axis, both when flexible surface 501 is horizontally planar. In some embodiments, flexible surface 501 may have a substantially rectangular shape, but other shapes are usable. Rectangular flexible surface 501 illustrated in FIG. 5A may include end edges 509a, 509b that are parallel to major axis 505, and end edges 511a, 511b that are parallel to minor axis 507. Flexible surface 501 is made from a substantially smooth surface, smoothness being relative to the dimensions of pushpin 100, and is made from a material having a small but nonzero amount of friction or tackiness. Flexible surface 501 is supported and moved by a support apparatus (not illustrated in FIG. 5A).

Flexible surface 501 is configured to be bendable or at least partially foldable around a bend axis that is parallel to major axis 505. Flexible surface 501 may be made from a loosely-layered stack of a thin material such as a stack of conventional 8.5"×11" office paper. A stack of approximately ⅛" thickness is sufficient. The thinness of the material and shortness of the stack allows for bending of the stack with a relatively small amount of force. The loosely-layered nature of the stack means that each layer of the stack is not rigidly coupled to an adjacent layer over a significant amount of the surface area of the layer. However, the loosely-layered nature of the stack still permits a coupler such as a paper clip, binder clip, rivet, or the like to be used in order the keep the stack aligned vertically when the stack is planar. Any such couplers should be on only one side of the stack with respect to the bend axis.

When pushpin 100 is laying flat on a horizontal flat surface, circumferential edges of first circumferential ridge 108 and second circumferential ridge 104 usually will make contact with the flat surface, and sharp tip 116 will be pointed upward at an angle greater than parallel to the flat surface. Assuming no slippage between pushpin 100 and the flat surface, pushpin 100 will trace an arc if it rolls around on the flat surface. The radius of the arc may be determined by the diameters of first circumferential ridge 108 and second circumferential ridge 104, and the spacing between major surface 112 and major surface 114. For example, with respect to the previously stated exemplary dimensions of pushpin 100, let $R_1$ be the radius of a first arc traced by first circumferential ridge 108. The first arc will have a circumference of $2\pi R_1$. Then the radius of a second arc traced by second circumferential ridge 104 is $R_2=(R_1-12.4 \text{ mm})$, and the second arc will have a circumference of $2\pi R_2$. The ratio of the circumferences of the first and second arcs will be the same as the ratio of the circumferences of first circumferential ridge 108 and second circumferential ridge 104, i.e., approximately 1.25 (8.8/7.0). Therefore, solving for $R_2=(R_1-12.4)$ and $R_1=1.25R_2$ produces $R_1=62.0$ mm and $R_2=49.6$ mm. In practice, a somewhat larger area may be needed to account for uncertainty in the initial position of pushpin 100 on the flat surface, possible sliding as the pushpin rolls, and for tolerances in pushpin dimensions.

Flexible surface 501, when configured to be planar and horizontal, may be used as a surface to allow receiving a single pushpin 100 at a time. For example, a single pushpin 100 may be dropped onto flexible surface 501 by selection apparatus 300. After dropping onto flexible surface 501, pushpin 100 will tend to lay on its side but with a random orientation around an axis perpendicular to flexible surface 501.

Figure 5B:
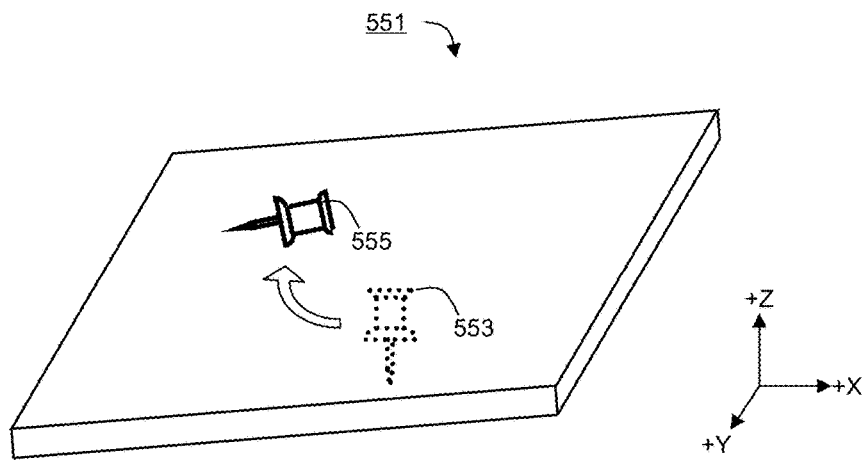
FIG. 5B illustrates a perspective view of a flexible surface in a tilted orientation, in accordance with an embodiment of the present disclosure.

At least the top surface 503 of flexible surface 501 should be selected to have a predetermined amount of friction or tackiness. After flexible surface 501 receives pushpin 100, flexible surface 501 may be slightly inclined while maintaining a planar shape, in order to properly align pushpin 100. FIG. 5B illustrates a flexible surface 551 that is planar and inclined in a horizontal direction by rotating flexible surface 501 around the Y-axis.

The slight tilt of planar flexible surface 551 will tend to cause pushpin 100 to roll rather than slide across surface 551. In particular, pushpin 100 may roll in an arc path, e.g., from position 553 to position 555. Position 555 will be a position in which sharp tip 116 of pushpin 100 tends to point in a direction of maximum downward gradient of flexible surface 551. The smoothness and friction of flexible surface 551 and the degree of tilt of flexible surface 551 should be chosen together such that pushpin 100 rolls freely without sliding on tilted flexible surface 551. The size of the flat surface should be large enough to accommodate the arc produced by pushpin 100 as it rolls, e.g., at least $2R_1$ plus margin. In some embodiments, using a flat surface having friction similar to conventional 8.5"×11" office paper, a tilt of approximately 4 to 8 degrees is ordinarily sufficient to make pushpin 100 roll without sliding. A vibration, slight jolt, tap, or the like imparted to flat surface 551 may be used to overcome stiction, or to overcome an initial pushpin orientation that is turned about 180 degrees from the desired orientation, and start the rolling motion when flat surface 551 is tilted. A surface similar to linen, or to vinyl with a slight tackiness, may also provide an appropriate combination of friction and smoothness.

Figure 6:
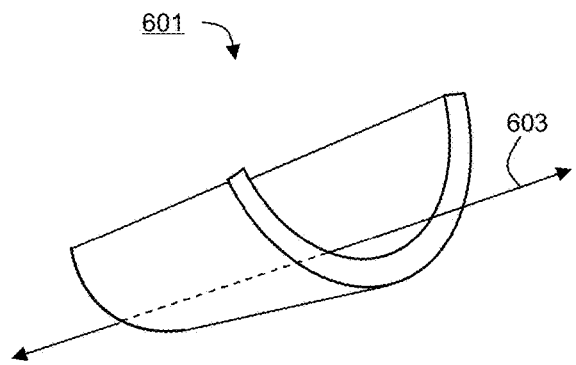
FIG. 6 illustrates a perspective view of a flexible surface bent around bend axis, in accordance with an embodiment of the present disclosure.

After flexible surface 551 has been tilted around the +Y axis and sharp tip 116 is oriented generally in the direction of maximum negative gradient, flexible surface 551 may be concavely bent around a bend axis. FIG. 6 illustrates a perspective view of flexible surface 601 concavely bent around bend axis 603. Bend axis 603 makes an angle with respect to the +X axis equal to the degree of tilt of flexible surface 601 around the Y axis. Although flexible surface 601 is illustrated as being bent into a concave U-shape in a plane perpendicular to bend axis 603, other concave shapes of the bend may be usable. For example, a V-shape bend may be used, or a hybrid shape between a U-shape and a V-shape. All such usable bend shapes will be referred to herein as U-shape for ease of reference.

The bend illustrated in FIG. 6 has two effects. First, the bend will tend to maintain sharp tip 116 of pushpin 100 (not illustrated in FIG. 6) pointing in the same direction of maximum negative gradient as illustrated in FIG. 5B. Second, the bend will tend to move pushpin 100 toward the trough of flexible surface 601, thus roughly positioning pushpin 100 with respect to flexible surface 601 and being able to better control spatially where pushpin 100 will be removed from flexible surface 601.

Figure 7:
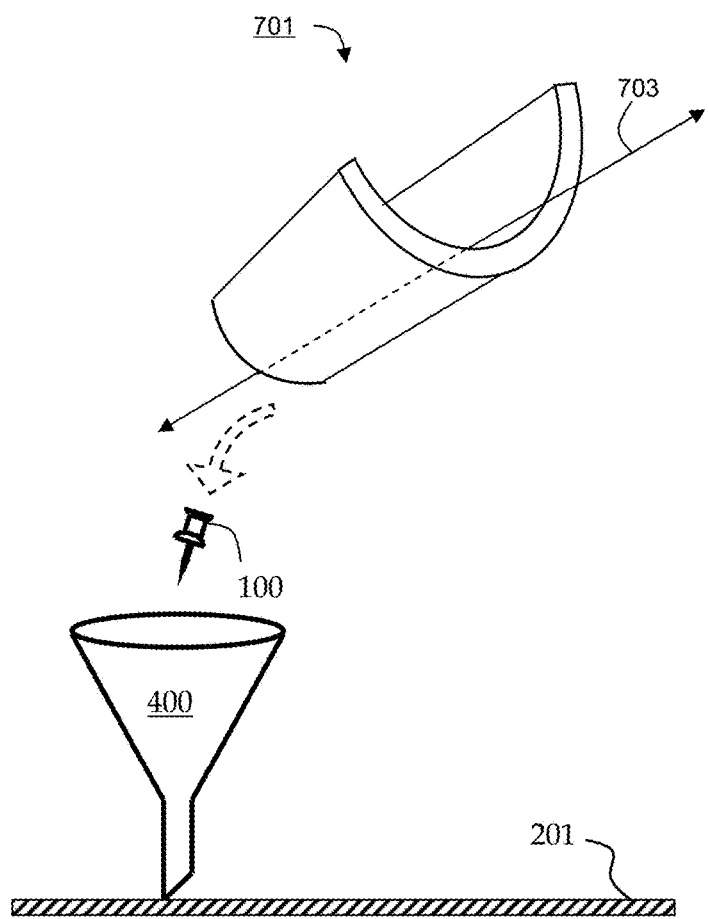
FIG. 7 illustrates a perspective view of a flexible surface bent around bend axis and delivering a pushpin, in accordance with an embodiment of the present disclosure.

FIG. 7 illustrates a perspective view of flexible surface 701 having a greater amount of tilt than flexible surface 601 of FIG. 6. The greater amount of tilt causes pushpin 100 to slide from flexible surface 701 in a pinpoint-first orientation, as illustrated in FIG. 7. Flexible surface 701 should have a sufficiently low amount of friction and roughness so that pushpin 100 slides rather than tumbles along flexible surface 701. In some embodiments, a tilt of at least about 30 degrees is sufficient to cause the pushpin to slide. The U-shaped bend helps maintain the pinpoint-first orientation as pushpin 100 slides along flexible surface 701. However, the position of pushpin 100 as it slides off from flexible surface 701 is too uncertain to be used directly for positioning pushpin 100 onto substrate 201. Nevertheless, the position of pushpin 100 as it slides off from flexible surface 701 should be known well enough to be caught by a funnel with a sufficiently-sized opening. For example, a funnel having an opening diameter of about 2-3 inches is ordinarily sufficient.

Funnel 400 may be positioned below the lower end of flexible surface 701 as illustrated in FIG. 7 in order to catch pushpin 100 as it slides off from flexible surface 701. At the same time, funnel 400 is also pre-positioned such that the tip of neck 402 is located at the position on substrate 201 where pushpin 100 is intended to be inserted. After funnel 400 catches pushpin 100, pushpin 100 passes through neck 402 and is held by neck 402 in an upright position (i.e., sharp tip 116 pointed downward) on substrate 201 at a location where pushpin 100 is to be inserted into substrate 201.

After pushpin 100 is held by neck 402 on substrate 201, a force may be applied in the −Z axis direction in order to insert pushpin 100 into substrate 201. For example, a plunger or the like that is narrow enough to fit through the interior of neck 402 may be used to apply a force in order to insert pushpin 100 into substrate 201. Z-axis force may be provided by a pinion gear meshing with a rack, a belt drive, a gear and sprocket drive, and so forth. Z-axis force may also be provided by a flexible material (rope, string, thread, fishing line, etc.) wound around a spool to provide force in the +Z-axis direction, with force in the −Z-axis direction provided by gravity, i.e., letting a plunger, punch, or the like fall by gravity onto pushpin 100.

It if is desired to insert pushpin 100 into substrate 201 at a non-perpendicular angle with respect to the plane of substrate 201, funnel 400 may be held at an angle such that neck 402 makes the desired angle with substrate 201, and an insertion force would be applied at the non-perpendicular angle.

Figure 8:
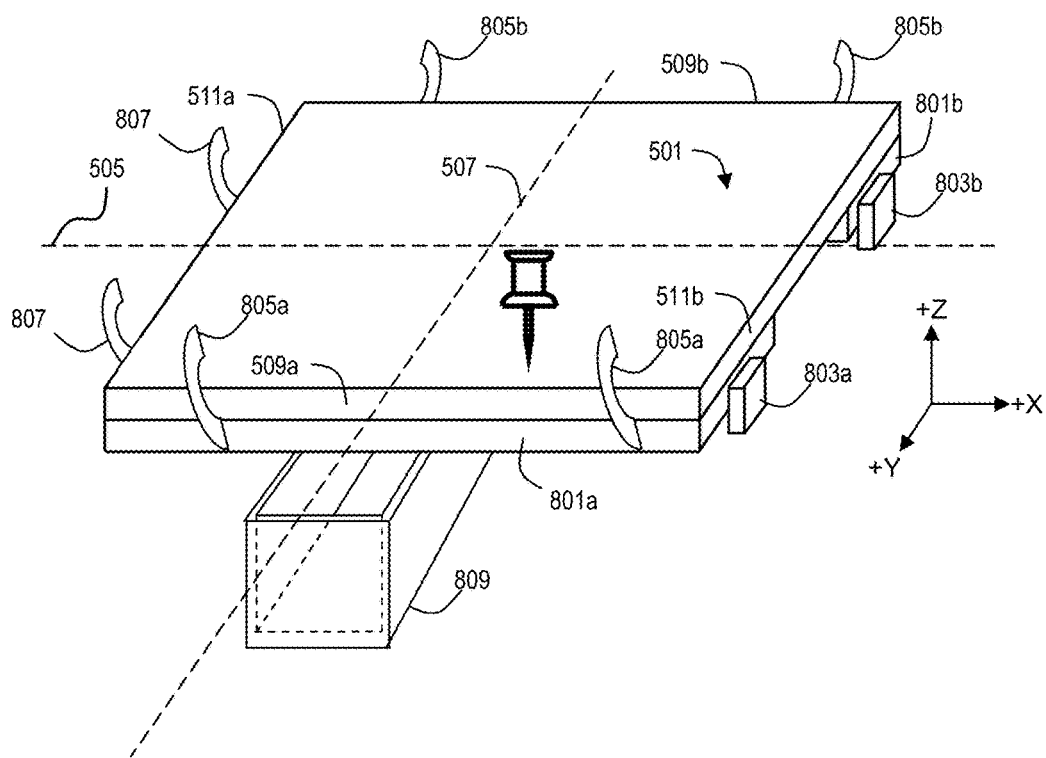
FIG. 8 illustrates a perspective view of flexible surface integrated with a support apparatus, in accordance with an embodiment of the present disclosure.

FIG. 8 illustrates a perspective view of flexible surface 501 integrated with a support apparatus. FIG. 8 is not necessarily drawn to scale. The support apparatus includes a first lateral support surface 801a and a second lateral support surface 801b. Lateral support surfaces 801a, 801b run along at least substantially the entire lateral length of flexible surface 501 (i.e., parallel to the X-axis direction), and are disposed on opposite sides of major axis 505. Additional lateral support elements may be disposed adjacent to and substantially co-planar with lateral support surfaces 801a or 801b in order to extend across a significant portion of the width of flexible surface in the Y-axis direction. Lateral support surfaces 801a, 801b may rotate around respective axes, which are parallel to major axis 505. To help facilitate this rotation, a gap may be formed along major axis 505 between lateral support surfaces. The function of lateral support surfaces 801a, 801b is to bend flexible surface 501 around bend axis 603 as shown in FIG. 6, as lateral support surfaces 801a, 801b rotate around their respective axes.

Lateral support surfaces 801a, 801b may be coupled to a respective coupler 803a, 803b, which further couples lateral support surfaces 801a, 801b to a respective axle, either directly or indirectly.

Lateral support surface 801a may be coupled to a set of side supports 805a, on a side of lateral support surface 801a facing the +Y direction. Similarly, lateral support surface 801b may be coupled to a set of side supports 805b, on a side of lateral support surface 801b facing the −Y direction. Side supports 805a, 805b extend in the +Z direction, above the height in the Z-axis of flexible surface 501. The function of side supports 805a, 805b is to prevent flexible surface 501 from sliding off of lateral support surfaces 801a, 801b in the +Y or −Y directions, or otherwise help prevent flexible surface 501 from becoming substantially misaligned with lateral support surfaces 801a, 801b, as lateral support surfaces 801a, 801b rotate around their respective axes. Side supports 805a, 805b also tend to facilitate the bending of a flexible surface 501 into a U-shape around bend axis 603, 703.

In some embodiments, side supports 805a, 805b may have a curved shape that is curved toward to the center of flexible surface 501. The curvature may tend to keep layers of flexible surface 501 properly aligned as flexible surface 501 is bent into the U-shaped configuration of flexible surface 701 shown in FIG. 7. In other embodiments, side supports 805a, 805b may have a flat shape that is angled at less than 90 degrees with respect to the plane of respective lateral support surfaces 801a, 801b.

Lateral support surfaces 801a, 801a each may be further coupled to at least one end support 807. End supports 807 extend in the +Z direction, above the height in the Z-axis of flexible surface 501. End supports 807 are coupled to a respective end of lateral support surfaces 801a, 801b that is expected to be lower when flexible surface 501 is tilted as shown in FIGS. 5B, 6 and 7 (i.e., in the −X direction). End supports 807 are optional on an opposite side of lateral support surfaces 801a, 801b (i.e., in the +X direction). End supports 807 function to prevent flexible surface 501 from sliding from lateral support surfaces 801a, 801b when lateral support surfaces 801a, 801b are tilted as shown in FIGS. 5B, 6 and 7. End supports 807 are situated on lateral support surfaces 801a, 801b such that end supports 807 are unlikely to block a pushpin 100 sliding from U-shaped flexible surface 701 situated as illustrated in FIG. 7.

Channel bracket 809 may be disposed underneath lateral support surfaces 801a, 801b and may have a major axis parallel to axis 507. Channel bracket 809 provides support as will be apparent from FIG. 9.

Figure 9:
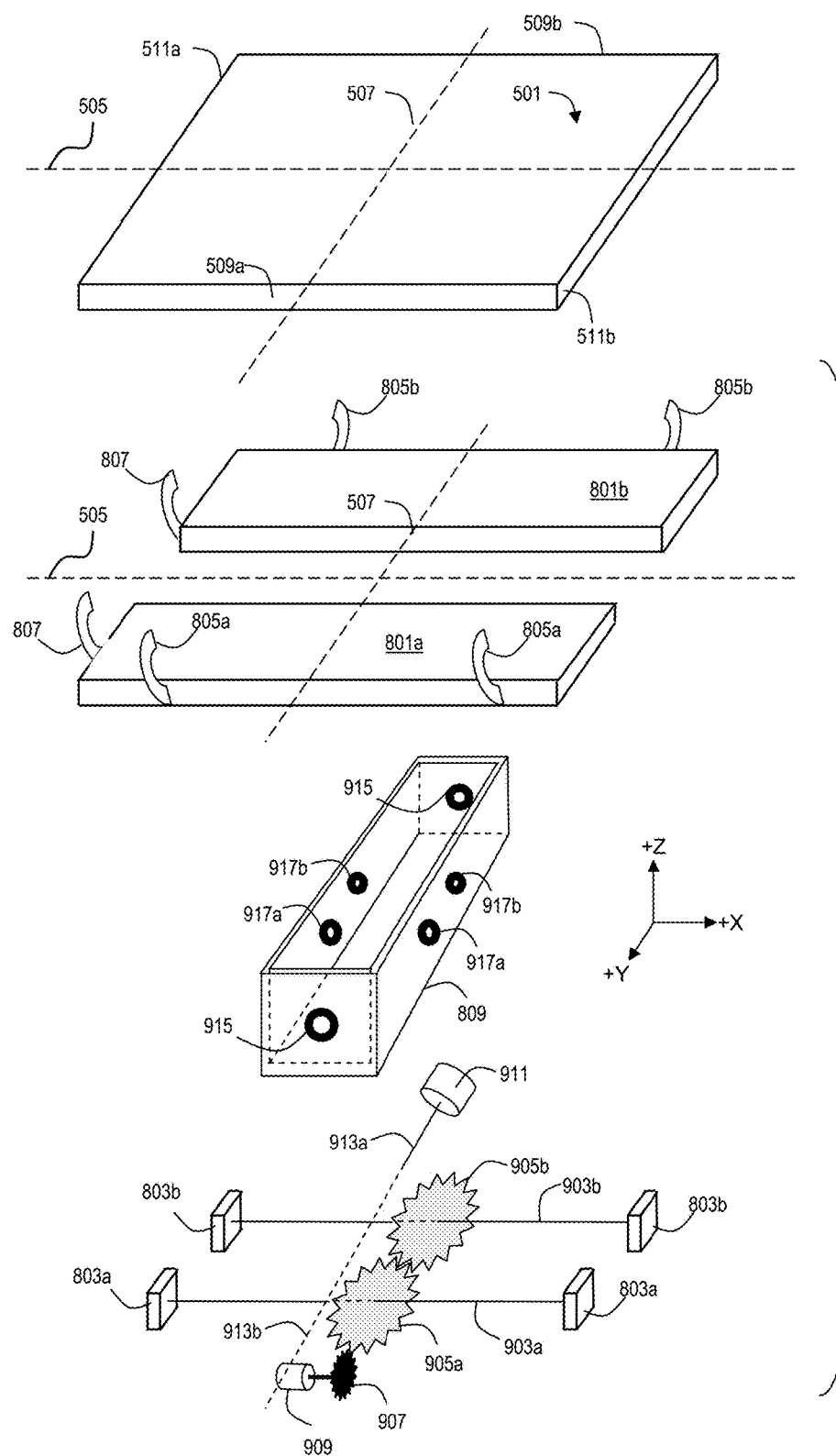
FIG. 9 illustrates an exploded view of a support apparatus that is usable to support a flexible surface, in accordance with an embodiment of the present disclosure.

FIG. 9 illustrates an exploded view of a support apparatus 901 that is usable to support flexible surface 501, in accordance with an embodiment of the present disclosure. Items of like reference numbers have been described in previous figures.

FIG. 9 illustrates channel bracket 809 in more complete detail. Channel bracket 809 has a major axis that is parallel to the Y-axis. Channel bracket 809 may take on the shape of a rectangular parallelepiped, but may be open on one or more sides. Channel bracket 809 provides support directly or indirectly to other elements of support apparatus 901. Indirect support means that there may be an intermediate element between channel bracket 809 and a particular element that it supports indirectly.

Channel bracket 809 provides support to a mechanism that is able to counter-rotate lateral support surfaces 801a, 801b about respective axes that are parallel to the X-axis. One such embodiment of the mechanism is described below in reference to the lower portion of FIG. 9. Another embodiment of the mechanism is described below in reference to FIG. 12. The counter-rotation of lateral support surfaces 801a, 801b will cause them to move between a first position that is substantially co-planar and a second position that has a V-shaped cross-section in the Y-Z plane. When flexible surface 501 is laying on top of lateral support surfaces 801a, 801b, the first position will cause flexible surface 501 to be substantially planar, and the second position will cause flexible surface 501 to take on a U-shape. The precise shape of the U-shape will depend upon the angle of the V-shaped cross-section of lateral support surfaces 801a, 801b and the stiffness of flexible surface 501.

Channel bracket 809 may be rotatably coupled to axles 903a, 903b, by way of pairs of respective ball bearing hubs 917a, 917b or the like. A ball bearing hub such as hubs 917a and 917b has a center portion that is rotatable with respect to a circumferential outer portion. The center portion has an aperture, which allows an axle or the like to pass through the center portion and to snugly rotate with respect to the outer portion. The outer portion of ball bearing hubs 917a, 917b may be rigidly affixed to channel bracket 809.

Each pair of ball bearing hubs 917a, 917b may have one hub of the pair disposed on a side of channel bracket 809 facing the +X direction, and have the other hub of the pair disposed on a side of channel bracket 809 facing the −X direction. Axles 903a, 903b extend parallel to the X-axis through both lateral sides of channel bracket 809, and are separated in a transverse direction along the Y-axis. Axles 903a, 903b may be configured to counter-rotate relative to each other. For example, in one embodiment, axles 903a, 903b may each be coupled to respective gears 905a, 905b. Gears 905a, 905b may mesh, such that as one gear rotates clockwise, the other rotates counterclockwise, and vice versa. Gears 905a, 905b may be driven by a pinion gear 907, which in turn is driven by a first motor 909. First motor 909 may be a stepper motor in order to precisely control the angle of rotation. First motor 909 in turn may be rigidly or substantially rigidly coupled to channel bracket 809.

In some embodiments, couplers 803a, 803b may be rigidly coupled to axles 903a, 903b, respectively, such that couplers 803a, 803b also counter-rotate relative to each other. Couplers 803a, 803b in turn may be rigidly coupled to lateral support surfaces 801a, 801b, respectively. In other embodiments, at least one of couplers 803a, 803b may be replaced with a coupler coupled directly to gears 905a, 905b, respectively.

Channel bracket 809 further may be coupled substantially rigidly to axle 913a, coupled on the side of channel bracket 809 facing the −Y direction. Axle 913a runs substantially parallel to the Y-axis. Axle 913a is further coupled to second motor 911, which is configured to rotate axle 913a, and which in turn rotate channel bracket 809 around the Y-axis. The rotation of channel bracket 809 around the Y-axis, driven by second motor 911, causes the tilt illustrated in FIGS. 5B, 6 and 7. Second motor 911 may be a stepper motor in order to precisely control the angle of tilt. Axle 913a, and indirectly the entirety of support apparatus 901, may be rotatably coupled to a channel bracket support structure 1017 (illustrated in part in FIG. 10A) by use of a ball bearing hub 915 or the like. Ball bearing hub 915 be disposed on a side of channel bracket 809 facing the −Y direction. Axle 913a may pass through ball bearing hub 915, before being coupled to channel bracket 809. Channel bracket support structure 1017 may be moved as necessary in the XY plane in order to support placing of funnel 400 at different locations on substrate 201.

In some embodiments, an axle coupled to second motor 911 may extend at least the entire length of channel bracket 809, as illustrated in FIG. 9 as axle 913b. Axle 913b would run from second motor 911 to at least the side of channel bracket 809 facing the +Y direction. Axle 913b would be substantially rigidly coupled to the side of channel bracket 809 facing the +Y direction, and then pass to another ball bearing hub 915 or the like disposed on a side of channel bracket 809 facing the +Y direction, in order to couple axle 913b to channel bracket support structure 1017. Embodiments that use axle 913b may offset axles 903a, 903b in the Z-axis direction relative to axle 913b, such that axles 903a, 903b and 913b may all pass through channel bracket 809 without interference.

Figure 10A:
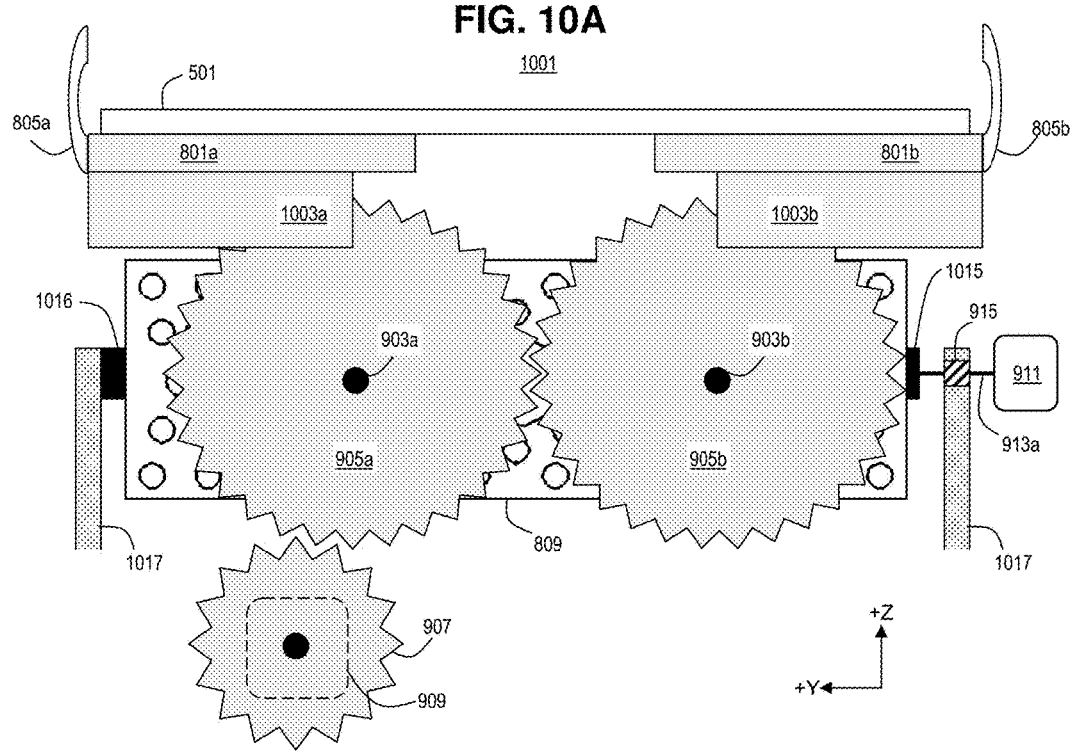
FIG. 10A illustrates a side planar view in the Y-Z plane of a support apparatus, in accordance with an embodiment of the present disclosure.

FIG. 10A illustrates a side planar view in the Y-Z plane of an embodiment 1001 of a support apparatus. Items of like reference numbers have been described in previous figures. A difference between embodiment 1001 and embodiment 901 is that embodiment 1001 replaces one of couplers 803a and one of coupler 803b with coupler 1003a and coupler 1003b, respectively. Couplers 1003a, 1003b may rigidly couple gears 905a, 905b to lateral support surfaces 801a, 801b, respectively. The coupling of coupler 1003 to gear 905 may be by way of screw, bolt, rivet, adhesive, etc. In some embodiments, couplers 1003 may be molded from or otherwise a part of gears 905, e.g., as a wing or lever-like shape. Such an embodiment may be usable if, for example, gears 905 do not make a full revolution during normal operation of embodiment 1001 and therefore there would be no need to have gear teeth disposed around the entire circumference of gears 905. Motor 909 is illustrated in phantom behind pinion gear 907, but in some embodiments motor 909 may be visible depending on the relative sizes of motor 909 and pinion gear 907.

Embodiment 1001 includes at least one coupler 1015, on the side of channel bracket 809 facing the −Y direction. A second coupler 1015 (not shown in FIG. 10A), if used, would be disposed on the side of channel bracket 809 facing the +Y direction. Couplers 1015 rigidly or substantially rigidly couple axles 913a and/or 913b to channel bracket 809. For example, axle 913a may pass through coupler 1015, with a set screw or collar screw on coupler 1015 making a rigid coupling to axle 913a. In turn, coupler 1015 may be screwed to channel bracket 809. Embodiment 1001 also illustrates at least one ball bearing hub 915, disposed on the side of channel bracket 809 facing the −Y direction, which is rotatably coupled to axle 913a and rigidly coupled to channel bracket support structure 1017. A second ball bearing hub 915 (not shown in FIG. 10A), if used, would be disposed on the side of channel bracket 809 facing the +Y direction.

Embodiment 1001 is illustrated with swivel hub 1016. Swivel hub 1016 includes two halves that are rotatable relative to each other around an axis of rotation. The axis of rotation of swivel hub 1016 is substantially parallel to the Y-axis. One half of swivel hub 1016 may be rigidly coupled to channel bracket 809, and the other half of swivel hub 1016 may be rigidly coupled to channel bracket support structure 1017. Swivel hub 1016 allows for channel bracket 809 to be rotatably coupled to channel bracket support structure 1017. Swivel hub 1016 will be useful on the side of channel bracket 809 facing the +Y direction when axle 913a (rather than axle 913b) is used. Swivel hub 1016 may also be used to replace the combination of 915 and 1015 on the −Y side of channel bracket 809 if swivel hub 1016 allows for an axle such as axle 913a to pass through it.

FIG. 10A illustrates flexible surface 501 laying on top of embodiment 1001, and in particular on top of lateral support surfaces 801a, 801b. Flexible surface 501 does not necessarily have the same transverse width as that of lateral support surfaces 801a, 801b together.

Figure 10B:
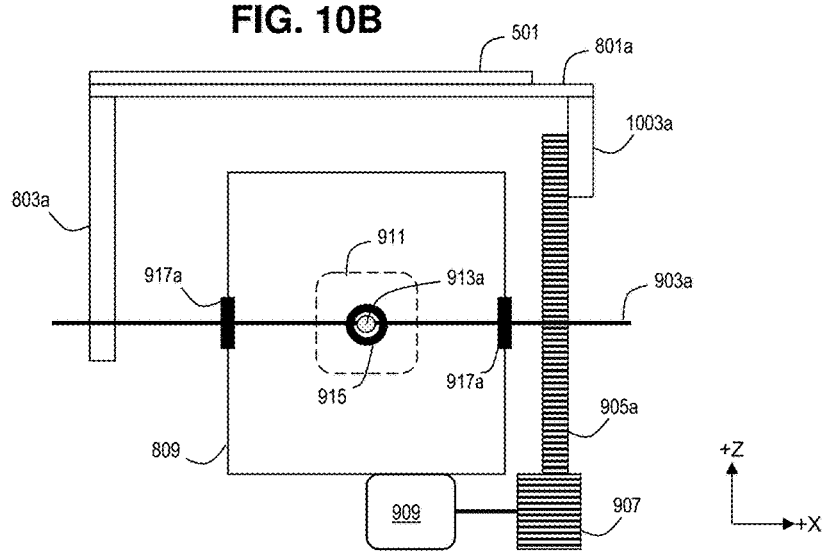
FIG. 10B illustrates a side planar view in the X-Z plane of a support apparatus, in accordance with an embodiment of the present disclosure.

FIG. 10B illustrates a side planar view in the X-Z plane of embodiment 1001 of a support apparatus. Items of like reference numbers have been described in previous figures. For sake of clarity, channel bracket support structure 1017 is not shown in FIG. 10B. Flexible surface 501 is illustrated laying on top of first lateral support surface 801a. Flexible surface 501 may have a lateral length that is different than the lateral length of first lateral support surface 801a.

FIG. 11A illustrates a perspective view a channel bracket support structure 1117 in accordance with an embodiment of the present disclosure. FIG. 11A is illustrated with axle 913b and a second ball bearing hub 915. Similarly, FIG. 11B illustrates a perspective view a channel bracket support structure 1117 in accordance with an embodiment of the present disclosure, but with usage of axle 913a and swivel hub 1016.

FIG. 12 illustrates another embodiment 1200 of a mechanism that may be useful to counter-rotate lateral support surfaces 801a, 801b about respective axes that are parallel to the X-axis. Embodiment 1200 and a motor to drive it may be supported by channel bracket 809, such that as channel bracket 809 is rotated around the Y-axis (and thus causing bend axis 603 to make a non-zero angle with the X-axis), embodiment 1200 will also rotate with channel bracket 809.

Embodiment 1200 includes a double-sided rack 1201, having a major axis perpendicular to bend axis 603, and gear track running along at least a portion of the length of rack 1201 along opposite sides of rack 1201. Embodiment 1200 includes a pair of gears 1205a, 1205b that are disposed on opposite sides of rack 1201, and which are configured to mesh with the gear track on rack 1201. Gears 1205a, 1205b are configured to counter-rotate around respective axles (not illustrated in FIG. 12), parallel to bend axis 603, similar to axles 903a, 903b. Couplers 1203a, 1203b may rigidly couple gears 1205a, 1205b to lateral support surfaces 801a, 801b, respectively. The coupling of couplers 1203a, 1203b to gears 1205a, 1205b may be by way of screw, bolt, rivet, adhesive, etc. In some embodiments, couplers 1203a, 1203b may be molded from or otherwise be a part of gears 1205a, 1205b, e.g., as a wing or lever-like shape. Such an embodiment may be usable if, for example, gears 1205a, 1205b do not make a full revolution during normal operation of embodiment 1201 and therefore there would be no need to have gear teeth disposed around the entire circumference of gears 1205a, 1205b.

Rack 1201 is configured to move up and down, i.e., in a direction perpendicular to bend axis 603. As rack 1201 moves up and down, gears 1205a, 1205b will counter-rotate relative to each other. This movement of gears 1205a, 1205b will cause lateral support surfaces 801a, 801b to rotate around respective axes that are parallel to bend axis 603. Flexible surface 501 (not illustrated in FIG. 12), laying on top of lateral support surfaces 801a, 801b, will then move between a substantially planar shape and a U-shape. The lateral length of flexible surface 501 may be less than the lateral length of lateral support surfaces 801a, 801b, in order to leave an uncovered gap between lateral support surfaces 801a, 801b such that rack 1201 may move through the uncovered gap as rack 1201 moves up and down. Rack 1201 may be driven by a force source such as a linear actuator, or a motor with pinion that also meshes with rack 1201.

Movement to Next Pushpin Location

After pushpin 100 is inserted into substrate 201 at a desired location, substrate 201 and/or funnel 400 are moved relative to one another in the X-Y plane in order to position the tip of funnel 400 for insertion of the next pushpin 100 at the next desired location on substrate 201. Funnel 400 and/or substrate 201 may be moved by use of a motion-controlled table. Guide tube 353 if used may be flexible, and movement of just an exiting end of guide tube 353 may allow selection apparatus 300 to remain in a relatively fixed location if funnel 400 is moved, since flexible surface 501 and support apparatus 901 move along with movement of funnel 400 in the X-Y plane.

Method of Operation

Figure 13:
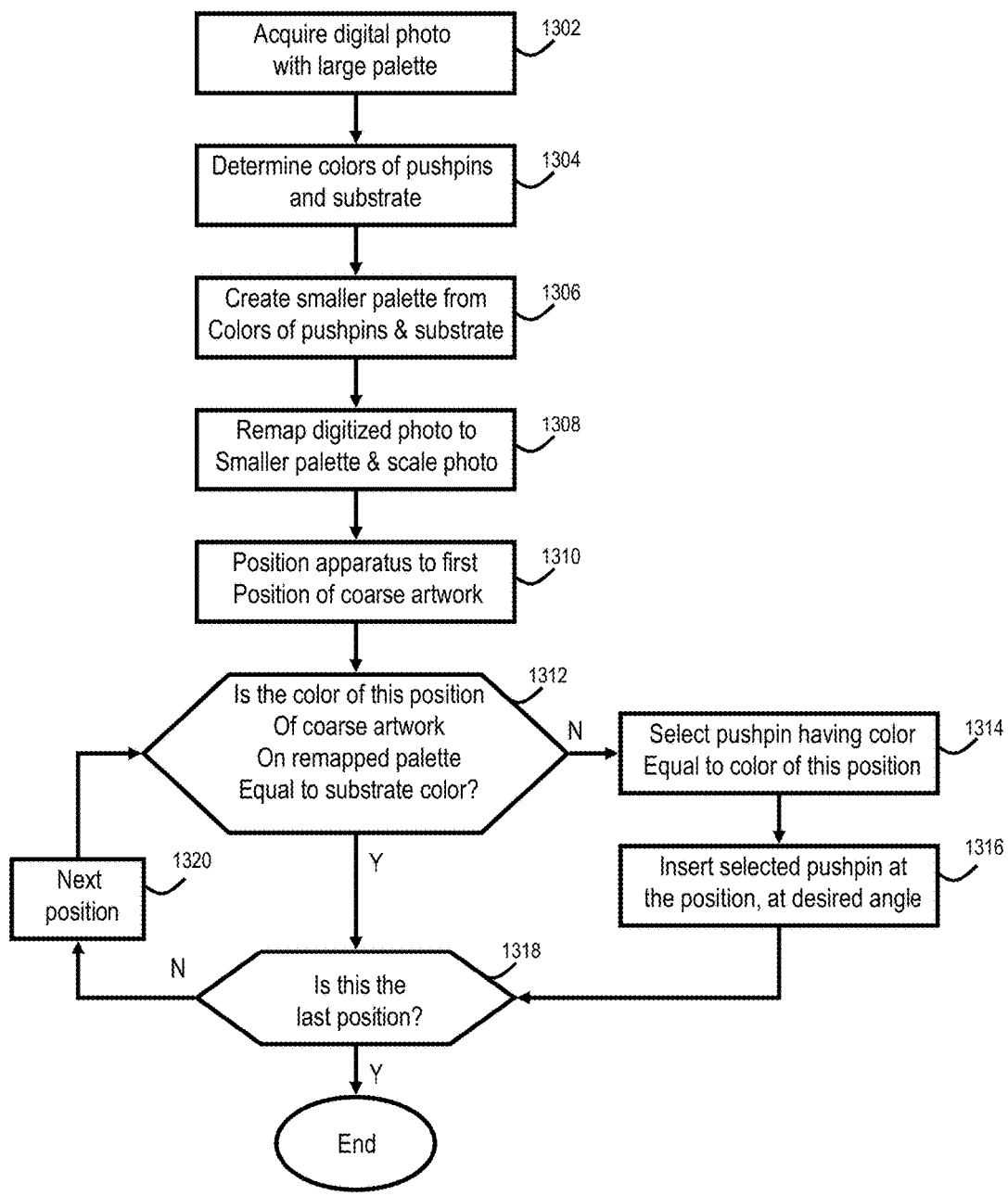
FIG. 13 illustrates a process to create a pushpin artwork, in accordance with an embodiment of the present disclosure.

FIG. 13 illustrates a process 1300 to create a pushpin artwork in accordance with an embodiment of the present disclosure. Process 1300 begins at step 1302, at which a digital image is acquired with a large color palette. The digital image may be, e.g., an image captured digitally or an image captured as a film-based photograph that is later digitally scanned. The digital image initially is finely digitized, as quantified either by the total number of pixels (e.g., 10 megapixels) or by a spatial resolution (e.g., 1200 dpi). The digital image is acquired with a large color palette, e.g., 16 million colors representable by a 24-bit color word.

Next, control of process 1300 transitions to step 1304, at which the colors of available pushpins and the substrate are determined. The pushpin colors by themselves form a first reduced color palette. The pushpin colors plus the substrate color together form a second reduced color palette. The size of the second reduced color palette should be one more than the size of the first reduced color palette.

The pushpin colors may be represented as a set of red, green, blue (RGB) vector triplet values, in which each vector component may be represented as an 8-bit word in the range of [0,255]. Exact RGB values for pushpins of a same nominal color may vary slightly from one supplier to another, but will be assumed to be the same for all pushpins of the same nominal color from a single supplier. For example, a small sample of blue pushpins from supplier "A" may be found to have RGB values of around [0, 0, 255], and a small sample of blue pushpins from supplier "B" may be found to have RGB values of around [0, 100, 255]. Thus, all blue pushpins from supplier A will be assumed to have RGB values of [0, 0, 255], and all blue pushpins from supplier B will be assumed to have RGB values of [0, 100, 255]. Mixing pushpins from different suppliers, although acceptable, should be avoided if possible unless they are treated as different colors.

In some embodiments, color variations from one supplier to another may be considered separate colors, thereby expanding the color palette. For example, if red pushpins from supplier A are bright red, and red pushpins from supplier B are dark red, they may be considered separate colors with separate RGB values, for the purpose of remapping described below.

In some embodiments, ideal colors may be assumed, i.e., red having RGB values of [255, 0, 0], green having RGB values of [0, 255, 0], blue having RGB values of [0, 0, 255], yellow having RGB values of [255, 255, 0], white having RGB values of [255, 255, 255], and black having RGB values of [0, 0, 0].

Next, control of process 1300 transitions to step 1306, at which a reduced color palette is created from the RGB values of the available pushpins and substrate, as determined from step 1304.

Next, control of process 1300 transitions to step 1308, at which the digital image from step 1302 ("unscaled photo") is scaled to a size compatible with the size of the substrate, and the colors of the digital image are remapped to the reduced color palette from step 1306. Photo scaling proceeds by, first, determining the size of the available substrate, e.g., 30 inches tall by 20 inches wide (i.e., 76 cm×51 cm), which is a form factor of 1.5:1. The unscaled photo is then cropped to the same form factor (e.g., 1.5:1).

The cropped photo is then scaled to the fit the combination of substrate size and pushpin spacing. The steps of cropping the unscaled photo to a form factor and scaling the cropped photo to fit the combination of substrate size and pushpin spacing are referred to herein collectively as redigitizing. The result of redigitizing is referred to herein as a redigitization. Assuming that pushpins will be placed in a rectangular grid (see FIG. 2A) having a center-to-center spacing of 1.0 cm, then the dimensions of the pushpin artwork on the exemplary substrate will be 76 pushpins×51 pushpins. Margin may be reserved around at least a portion of the periphery if framing is desired. On the other hand, pushpins may extend to at least some of the edges of the substrate if several substrates may be combined to form a single large digital artwork, e.g., if four substrates will be arranged in a 2×2 grid, with each substrate representing a respective quadrant of the unscaled photo. A row and column position of a predetermined pushpin may be referred to as an index position. After the photo is scaled, the colors of the photo are remapped to the reduced color palette from step 1306.

Scaling first and then followed by remapping to a reduced color palette allows for the image scaling process to take into account the full palette size when scaling. This may result in less overall color error after the scaled image is remapped to the reduced color palette, compared to an alternative of first remapping the cropped photo to a reduced color palette and then scaling the image.

Next, control of process 1300 transitions to step 1310, at which an apparatus that will insert pushpins into the substrate is positioned (i.e., moved) to an initial position. For example, the initial position may be the first location at which a pushpin might be inserted, or a first location at which a pushpin actually will be inserted (i.e., a non-background color), or to a predetermined home position. Control of process 1300 transitions to step 1312.

Next, control of process 1300 transitions to decision step 1312, at which a decision is made whether the desired color of the pushpin artwork at the currently-selected location is equal to the substrate color. If the outcome of decision step 1312 is negative, then control of process 1300 transitions to step 1314. If the outcome of decision step 1312 is affirmative, then control of process 1300 transitions to step 1318.

At step 1314, a pushpin of the desired color for the currently-selected location of the pushpin artwork is selected from an appropriate container by use of an apparatus such as selection apparatus 300. Alternatively, if a special effect is desired at the currently-selected location (e.g., transparency, reflectivity, etc.), a special pushpin with such qualities may be selected for insertion.

Next, control of process 1300 transitions to step 1316, at which the selected pushpin from step 1314 is oriented, positioned, and inserted into a substrate by use of an apparatus such as that depicted in one or more of FIGS. 5A-12. At the conclusion of step 1316, control of process 1300 transitions to step 1318.

At decision step 1318, a decision is made whether the currently-selected location of the pushpin artwork represents the final location at which a pushpin might be inserted. If the outcome of decision step 1318 is affirmative, then process 1300 ends. If the outcome of decision step 1318 is negative, then control of process 1300 transitions to step 1320.

At step 1320, the apparatus that will insert pushpins into the substrate is positioned (i.e., moved) to a next location. The next location may be a location at which a pushpin might be inserted, or a location at which a pushpin actually will be inserted. At the conclusion of step 1320, control of process 1300 transitions to step 1312.

Computing and Hardware Environment

FIG. 14 illustrates a functional block diagram of an embodiment of a system 1400 for creating a pushpin artwork. System 1400 includes a computing device 1402 such as a desktop personal computer, laptop, notebook PC, netbook, tablet, single-board computer such as Raspberry Pi™ ("Raspberry Pi" is a trademark of the Raspberry Pi Foundation), and so forth. Computing device 1402 should have sufficient computing and memory resources to perform one or more of steps 1302, 1304, 1306 and 1308 of FIG. 13 (referred to as steps 1302-1308). Computing device 1402 should also have sufficient input/output capability to allow a system operator (either an automated operator or a human operator) to monitor progress status when creating the pushpin artwork. Computing device 1402 may represent a collection of multiple processors that collectively perform steps 1302-1308.

Computing device 1402 may be coupled to a hardware controller 1404 by communication link 1401. Communication link 1401 may be a bidirectional serial communication line (e.g., USB). Hardware controller 1404 may be, for example, a controller selected from the Arduino™ family of controllers. Computing device 1402 may function to calculate the color of the next pushpin to be inserted, and calculate the index position of the pushpin. Computing device 1402 will then issue commands to hardware controller 1404 to carry out physical movements needed to select a pushpin, position it at the desired location, and insert it. Computing device 1402 may be preconfigured for each motor with a conversion factor between degrees of rotation and amount of linear or rotational motion. For example, computing device 1402 may be preconfigured such that a +45 degree movement of motor #1 will advance funnel 400 to the next pushpin column on the same row, or that a −720 degree movement of motor #5 will cause rotation of gears 905a, 905b such that lateral support surfaces 801a, 801b form a 90 degree angle with respect to each other, and so forth.

Hardware controller 1404 may be configured to execute an interpreter process, which will receive a command from computing device 1402, interpret the command, and then issue commands to the appropriate motor drivers 1405a . . . 1405d. For example, if hardware controller 1404 receives a command to move motor #1 by +45 degrees, hardware controller 1404 uses a predetermined degrees per step conversion factor of motor drivers 1405a (e.g., 1.8 degrees per step) to assert a direction control and issue the appropriate number of step commands to motor drivers 1405a, in this case 25 steps.

Alternatively, computing device 1402 may compute a required number of steps for a desired movement of a predetermined motor, and issue commands to hardware controller 1404 in terms of steps. For example, if computing device 1402 determines that a +45 degree movement of motor #1 is desired, and if computing device 1402 knows that motor #1 is configured to move 1.8 degrees per step, then computing device 1402 will issue a command to hardware controller 1404 to move motor #1 by 25 steps.

Hardware controller 1404 may also receive sensor readings such as from sensors 1408, and issue discrete commands (e.g., on/off commands) to discrete components 1409 (e.g., a relay), and may provide status to computing device 1402 through communication link 1401.

Motor drivers 1405a . . . 1405d receive step commands from hardware controller 1404 and energize motor coils in the selected motor 1406a . . . 1406d in the correct sequence in order to cause the commanded movement of motors 1406a . . . 1406d, respectively. Embodiments are not sensitive to the type of stepper motor and driver combination used, e.g., unipolar, bipolar, microstepping multiphase, etc. Some embodiments may use motor drivers 1405a . . . 1405d based upon the A3967SLB microstepping motor driver with built-in translator from Allegro® MicroSystems. Some embodiments may use motor drivers 1405a . . . 1405d based upon a darlington transistor array, such as the ULN family of chips from Texas Instruments®.

One motor driver 1405 is used per motor 1406, and may be grouped functionally as illustrated in FIG. 14. For example, motor drivers 1405a and motors 1406a represent a group that may be used to control table motion functions 1410. This may include XY plane movements to move funnel 400 to various positions on substrate 201 in order to support insertion of pushpin 100 at that location. This may also include controlling Z-axis movement of funnel 400.

Motor drivers 1405b and motors 1406b represent a group that may be used to control functions 1412, which may control support apparatus 901. This may include causing gears 905a, 905b or 1205a, 1205b to counter-rotate relative to each other. This may also include rotating channel bracket 809 around the Y-axis. Functions 1412 may also include control over a plunger or the like to apply force to insert pushpin 100 into substrate 201.

Motor drivers 1405c and motors 1406c represent a group that may be used to control pushpin selector functions 1414. This may include movement of tip 307 of selection apparatus 300 into a pushpin container, and operation of removal tool 311. Other embodiments of a selection apparatus that have been discussed (e.g., gripping arm or holding apparatus) if used would also be controlled by motor drivers 1405c and motors 1406c. Some functions under pushpin selector functions 1414 may not require motor control and may interface directly with hardware controller 1404. For example, one or more sensors 1408 that may detect whether exactly one pushpin has been selected may interface directly with hardware controller 1404. Relay control to energize and de-energize electromagnetic coils 303 may also interface directly with hardware controller 1404.

Motor drivers 1405d and motors 1406d represent a group that may be used to implement pushpin container control functions 1416. This may include causing movement of pushpin containers with respect to selection apparatus 300, and may work cooperatively with functions 1414. For example, rather than providing a separate selection apparatus 300 for each pushpin container, the various pushpin containers may be mounted on a moveable apparatus (e.g., a horizontal slide or a rotatable table), with selection apparatus 300 at a relatively fixed location, so that a pushpin container is brought to selection apparatus 300. In other embodiments, selection apparatus 300 may be moveable with respect to pushpin containers at respective relatively fixed locations.

The division of functions and motors/motor drivers illustrated in FIG. 14 are exemplary. Other or alternative identification of functions are possible, and some operations (e.g., moving a pushpin container relative to selection apparatus 300) may be viewed as being within the domain of more than one functional group.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

I claim:

1. A method to produce a decoration, comprising the steps of:
   providing a substrate comprising a major surface having a substrate color, the substrate having a size comprising a predetermined width and predetermined height, wherein a ratio of the width to the height forms an aspect ratio;
   providing a plurality of colored objects having a respective object width and a respective object height, each colored object having a respective color selected from a first reduced color palette, the first reduced color palette not including the substrate color;
   redigitizing a digital image to match a combination of substrate size and colored object spacing when the colored objects are arranged as a grid on the substrate, to produce a redigitized image;
   remapping a color palette of the redigitized image to a second reduced color palette, the second reduced color palette comprising the first reduced color palette plus the substrate color, to produce a remapped image comprising remapped pixels;

for each remapped pixel in the remapped image, perform the steps of:

if a color of the remapped pixel is a member of the first reduced color palette, selecting a colored object with a color equal to the color of the remapped pixel, and attaching the colored object to the substrate at a location corresponding to the remapped pixel; and if a color of the remapped pixel is equal to the substrate color, skipping attachment of a colored object to the substrate at the location corresponding to the remapped pixel.

2. The method of claim 1, wherein the step of redigitizing comprises the steps of:

cropping the digital image to the aspect ratio, to produce a cropped image;

scaling the cropped image to fit the combination of substrate size and colored object spacing.

3. The method of claim 1, wherein the step of redigitizing comprises the steps of:

scaling the digital image to fit the combination of substrate size and colored object spacing, to produce a scaled image; and cropping the scaled image to the aspect ratio.

4. The method of claim 2, wherein scaling the cropped image comprises the steps of:

dividing the substrate width by a width of a colored object, to produce a maximum width count; and downsampling the cropped image to have a width in pixels given by the maximum width count.

5. The method of claim 2, wherein scaling the cropped image comprises the steps of:

dividing the substrate height by a height of a colored object, to produce a maximum height count; and downsampling the cropped image to have a height in pixels given by the maximum height count.

6. The method of claim 1, wherein the grid comprises a rectangular grid.

7. The method of claim 1, wherein the grid comprises a hexagonal grid.

8. The method of claim 1, wherein the colored objects comprise pushpins, and the step of attaching the colored object to the substrate comprises inserting a pushpin into the substrate.

9. The method of claim 8, wherein the step of inserting a pushpin into the substrate comprises inserting at least a portion of the pushpins at a non-perpendicular angle into the substrate.

10. The method of claim 9, wherein pushpins inserted at a non-perpendicular angle comprise a portion of the digital image that represents a moving object.

11. The method of claim 1, wherein the major surface of the substrate comprises a second region having a second substrate color, and the step of skipping attachment of a colored object to the substrate at the location corresponding to the remapped pixel depends upon the substrate color at the location.

12. The method of claim 1, further comprising a step of affixing to the substrate an object having a surface with a metallic shine.

13. The method of claim 1, further comprising a step of affixing to the substrate a translucent object.

14. The method of claim 1, further comprising a step of applying a coating to the substrate to improve adherence of the colored objects to the substrate.

15. The method of claim 1, further comprising a step of reserving a margin region along at least one peripheral edge of the substrate, wherein no colored objects are affixed within the margin region.

16. The method of claim 1, wherein the colored objects form a portion of an image having a different depth than a portion of the image formed from a corresponding portion of the substrate without affixed colored objects.

17. The method of claim 1, wherein both the object width and object height respectively are substantially uniform among the plurality of colored objects.

18. The method of claim 1, wherein the substrate comprises a foam board.

19. The method of claim 1, wherein the substrate comprises a corkboard.

20. The method of claim 1, wherein the second reduced color palette comprises a six-color palette.

* * * * *